US012559022B2

(12) United States Patent
Itaba et al.

(10) Patent No.: US 12,559,022 B2
(45) Date of Patent: Feb. 24, 2026

(54) GATING CAMERA, VEHICLE SENSING SYSTEM, AND VEHICLE LAMP

(71) Applicant: KOITO MANUFACTURING CO., LTD., Tokyo (JP)

(72) Inventors: Koji Itaba, Shizuoka (JP); Masayuki Takahashi, Shizuoka (JP); Daiki Kato, Shizuoka (JP); Shun Tanemoto, Shizuoka (JP); Masatoshi Suzuki, Shizuoka (JP); Keita Kondo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 210 days.

(21) Appl. No.: 18/274,390

(22) PCT Filed: Jan. 26, 2022

(86) PCT No.: PCT/JP2022/002944
§ 371 (c)(1),
(2) Date: Jul. 26, 2023

(87) PCT Pub. No.: WO2022/163721
PCT Pub. Date: Aug. 4, 2022

(65) Prior Publication Data
US 2024/0083346 A1 Mar. 14, 2024

(30) Foreign Application Priority Data

Jan. 27, 2021 (JP) ................................ 2021-011409
Feb. 5, 2021 (JP) ................................ 2021-017734
Feb. 5, 2021 (JP) ................................ 2021-017735

(51) Int. Cl.
*B60Q 1/14* (2006.01)
*B60Q 1/00* (2006.01)
*G06V 20/56* (2022.01)

(52) U.S. Cl.
CPC ........... *B60Q 1/143* (2013.01); *B60Q 1/0023* (2013.01); *G06V 20/588* (2022.01)

(58) Field of Classification Search
CPC .... B60Q 1/143; B60Q 1/0023; G06V 20/588; G08G 1/166; G01S 17/18; G01S 17/894
See application file for complete search history.

(56) References Cited

U.S. PATENT DOCUMENTS 11,249,172 B2 * 2/2022 Mano ..................... G01S 7/4868
2014/0003709 A1 1/2014 Ranganathan et al.
(Continued)

FOREIGN PATENT DOCUMENTS

JP 2009-257981 A 11/2009
JP 2016-146113 A 8/2016
(Continued)

OTHER PUBLICATIONS

International Search Report (PCT/ISA/210) issued by the International Searching Authority on Apr. 19, 2022 in International Patent Application No. PCT/JP2022/002944.
(Continued)

*Primary Examiner* — Abdullah A Riyami
*Assistant Examiner* — Syed M Kaiser
(74) *Attorney, Agent, or Firm* — Sughrue Mion, PLLC

(57) ABSTRACT

A gating camera divides a field of view in a depth direction into multiple slices, and generates multiple slice images that correspond to the multiple slices. An illumination apparatus emits illumination light. A camera controller controls a light emission timing of the illumination apparatus and an exposure timing of an image sensor so as to generate slice images from a near slice to a farther slice. An arithmetic processing device judges whether a road surface appears for each of the slice images generated in sequence. Processing for a row (Continued)

judged to include a road surface in a given slice is simplified at the time of sensing of a slice farther than the given slice.

8 Claims, 29 Drawing Sheets

(56) References Cited

U.S. PATENT DOCUMENTS

| | | | |
|---|---|---|---|
| 2016/0232412 A1 | 8/2016 | Nishijima | |
| 2019/0004149 A1* | 1/2019 | Mano | G01S 17/89 |
| 2019/0004150 A1 | 1/2019 | Mano et al. | |
| 2019/0025432 A1 | 1/2019 | Mano | |
| 2020/0033452 A1 | 1/2020 | Takagawa et al. | |
| 2022/0214434 A1* | 7/2022 | Kato | G01S 7/484 |
| 2023/0179841 A1 | 6/2023 | Itaba et al. | |

FOREIGN PATENT DOCUMENTS

| | | |
|---|---|---|
| JP | 2019-28653 A | 2/2019 |
| JP | 2019-139420 A | 8/2019 |
| JP | 2020-16481 A | 1/2020 |
| JP | 2020-148633 A | 9/2020 |
| WO | 2017/110414 A1 | 6/2017 |
| WO | 2017/110417 A1 | 6/2017 |
| WO | 2020/184447 A1 | 9/2020 |

OTHER PUBLICATIONS

Written Opinion (PCT/ISA/237) issued by the International Searching Authority on Apr. 19, 2022 in International Patent Application No. PCT/JP2022/002944.
Office Action issued on Jun. 17, 2025 by the Japan Patent Office in counterpart Japanese Patent Application 2022-578453.

* cited by examiner

120

122

124

126

SEL1

SEL2

SELy

OUTx

OUT2

OUT1

PIX

PIX

PIX

PIX

PIX

PIX

PIX

PIX

PIX

VSCAN CIRCUIT

READOUT CIRCUIT

IMG

READOUT TIME

READOUT TIME

|  | FRAME | | | FRAME | | |
|---|---|---|---|---|---|---|
|  | $SF_1$ | $SF_2$ | $SF_3$ | | | |
| TAP1 | $RNG_1$ | $RNG_5$ | $RNG_9$ | | | |
| TAP2 | $RNG_2$ | $RNG_6$ | $RNG_{10}$ | | | |
| TAP3 | $RNG_3$ | $RNG_7$ | $RNG_{11}$ | | | |
| TAP4 | $RNG_4$ | $RNG_8$ | $RNG_{12}$ | | | |

COMPARISON TECHNIQUE

GATING CAMERA, VEHICLE SENSING SYSTEM, AND VEHICLE LAMP

CROSS-REFERENCE TO RELATED APPLICATIONS

This application is a National Phase Entry of PCT International Application No. PCT/JP2022/002944 filed on Jan. 26, 2022, which claims priority from Japanese Patent Application No. 2021-011409 filed on Jan. 27, 2021, Japanese Patent Application No. 2021-017734 filed on Feb. 5, 2021, and Japanese Patent Application No. 2021-017735 filed on Feb. 5, 2021, the contents of all of which are incorporated herein by reference in their respective entireties.

FIELD

The present invention relates to a gating camera.

BACKGROUND

An object identification system that senses the position and the kind of an object existing in the vicinity of the vehicle is used for autonomous driving or for autonomous control of light distribution of the headlamp. The object identification system includes a sensor and an arithmetic processing device configured to analyze an output of the sensor. The sensor is selected from among cameras, LiDAR (Light Detection and Ranging, Laser Imaging Detection and Ranging), millimeter-wave radars, ultrasonic sonars, and the like, giving consideration to the application, required precision, and cost.

It is not possible to obtain depth information from a typical monocular camera. Accordingly, it is difficult to separate multiple objects at different distances even when the multiple objects overlap.

As a camera capable of acquiring depth information, a TOF camera is known. The time of flight (TOF) camera is configured to project infrared light by a light emitting device, measure the time of flight until reflected light returns to an image sensor, and obtain a TOF image obtained by converting the time of flight into distance information.

As an active sensor instead of the TOF camera, a gating camera (Gating Camera or Gated Camera) has been proposed (Patent Literatures 1 and 2). The gating camera is configured to divide the image capture range into multiple slices, and to capture an image while changing an exposure timing and exposure time for each slice. Accordingly, a slice image can be acquired for each target slice, and each slice image includes only an object included in the corresponding slice.

CITATION LIST

Patent Literature

Patent Literature 1: JP2009-257981A
Patent Literature 2: WO2017/110417A1
Patent Literature 3: JP2020-16481A

SUMMARY OF INVENTION

Technical Problem

A. In a case of employing the gating camera as an in-vehicle sensor, such an arrangement is required to have a high frame rate. When multiple slices are sensed and the same processing is executed for all the rows for all the slices, this leads to a long time required to generate slice images of all the slices (which are referred to as "one frame"), leading to a decrease in the frame rate.

B. With the gating camera, the intensity (amount of received light) of the reflected light from an object received by the image sensor becomes stronger (larger) as the distance to the object becomes nearer, and weaker (smaller) as the distance becomes farther. Accordingly, in a case in which the intensity of the infrared light is set to a constant value during one frame in which multiple slices are scanned, as the slice image becomes farther, the pixel value becomes smaller, thereby making it difficult for an object to be identified.

In order to solve this problem, when sensing a far-distance slice, the number of light emission and exposure may be increased. However, with this method, since the sensing time of a far-distance slice becomes long, the time required to acquire an image of all the slices becomes long. This inevitably leads to a decrease in the frame rate.

The present disclosure has been made in view of such a situation, and an exemplary purpose of an aspect thereof is to provide a gating camera with an improved frame rate.

Solution to Problem

1. A gating camera according to an aspect of the present disclosure divides a field of view in a depth direction into multiple slices, and generates multiple slice images that correspond to the multiple slices. The gating camera includes: an illumination apparatus configured to emit illumination light to the field of view; an image sensor; a camera controller configured to control a light emission timing of the illumination apparatus and an exposure timing of the image sensor so as to generate slice images from a near slice to a farther slice; and an arithmetic processing device configured to judge whether a road surface appears for each of the slice images generated in sequence. The gating camera simplifies processing for a row judged to include a road surface in a slice image of a given slice at the time of sensing of a slice farther than the given slice.

2. An aspect of the present disclosure relates to a gating camera divides a field of view in a depth direction into multiple slices, and generates multiple slice images that correspond to the multiple slices. The gating camera includes: an illumination apparatus configured to emit illumination light to the field of view; an image sensor; and a camera controller configured to control light emission of the illumination apparatus and exposure of the image sensor so as to alternately repeat a forward scan for sensing from a near-distance slice toward a far-distance slice, and a reverse scan for sensing from a far-distance slice toward a near-distance slice, and configured to control the illumination apparatus such that an intensity of the illumination light increases with time in the forward scan and the intensity of the illumination light decreases with time in the reverse scan.

3. A gating camera according to an aspect of the present disclosure divides a field of view in a depth direction into multiple slices, and generates multiple slice images that correspond to the multiple slices. The gating camera includes: an illumination apparatus configured to emit illumination light to the field of view; an image sensor; a camera controller configured to switch a first scan to an M-th scan (M≥2) and to control light emission of the illumination apparatus and exposure of the image sensor such that boundaries of multiple slices in each of the first scan to the M-th scan are shifted by 1/M slice in the depth direction; and an arithmetic processing device configured to generate an image of a sub-slice that is a range obtained by dividing each slice into M portions in the depth direction by processing a first slice image group to an M-th slice image group acquired in the first scan to the M-th scan.

Advantageous Effect of the Invention

According to an aspect of the present disclosure, a frame rate can be improved.

DESCRIPTION OF EMBODIMENTS

Summary of Embodiments

Figure 1:
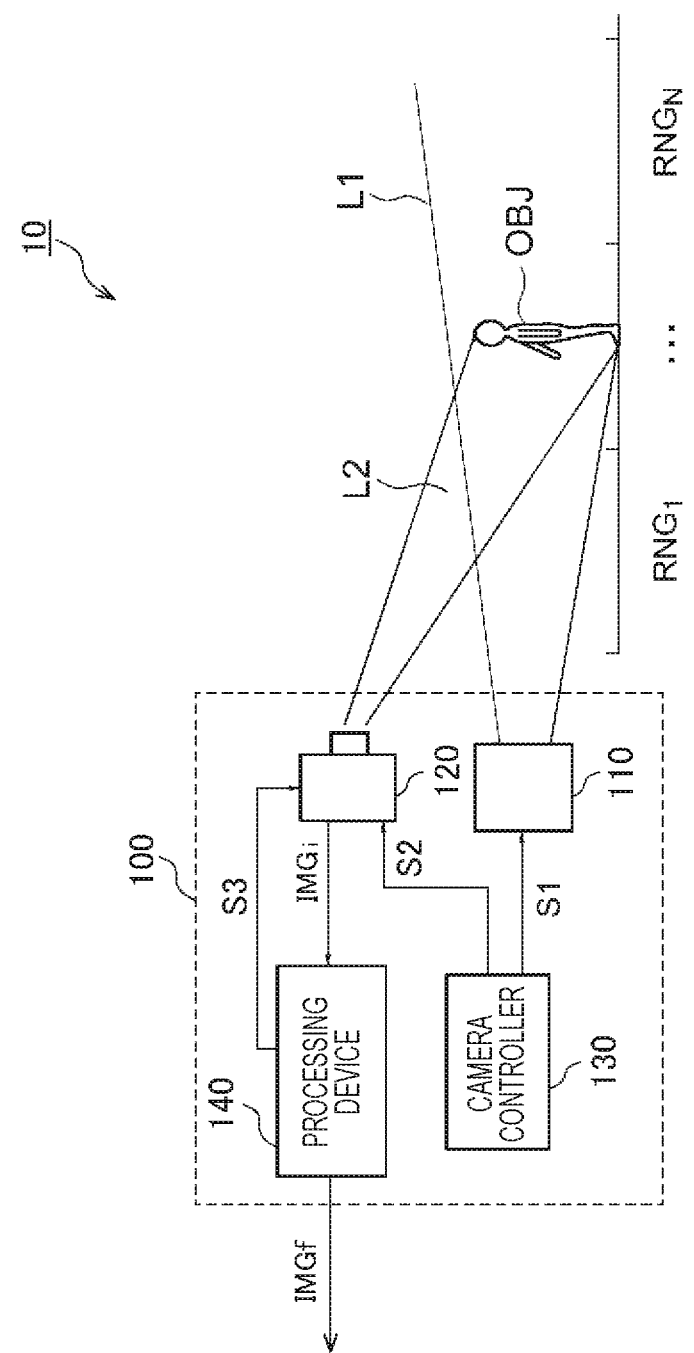
FIG. 1 is a block diagram of a sensing system according to Embodiment 1.

Description will be made regarding a summary of some exemplary embodiments of the present disclosure. The summary is provided as a prelude to the detailed description that will be described later, is intended to simplify the concepts of one or more embodiments for the purpose of basic understanding of the embodiments, and is not intended to limit the scope of the invention or the disclosure. The summary is not an extensive overview of all possible embodiments and is not intended to limit essential components of the embodiments. For convenience, "an embodiment" may be used to refer to a single embodiment (example or modification) or multiple embodiments (example or modification) disclosed in the specification.

1. A gating camera according to an embodiment divides a field of view in a depth direction into multiple slices, and generates multiple slice images that correspond to the multiple slices. The gating camera includes: an illumination apparatus configured to emit illumination light to the field of view; an image sensor; a camera controller configured to control a light emission timing of the illumination apparatus and an exposure timing of the image sensor so as to generate slice images from a near slice to a farther slice; and an arithmetic processing device configured to judge whether a road surface appears for each of the slice images generated in sequence. The gating camera simplifies processing for a row judged to include a road surface in a slice image of a given slice at the time of sensing of a slice farther than the given slice.

In a case in which the multiple slices are imaged at the same angle of view with the gating camera, assuming that reflection from a road surface is detected in a given row of a slice image obtained by sensing a given slice, in principle, reflected light cannot be incident on the same row of a slice image obtained by sensing a slice farther than the given slice. By simplifying the processing for the row on which the reflected light is not incident by using this property, generation time of the slice image and/or transmission time of image data can be reduced, and a frame rate can be improved.

In an embodiment, row processing may be simplified by skipping reading of a row in the image sensor. In an embodiment, the row processing may be simplified by skipping data transmission of the row.

In an embodiment, the arithmetic processing device may judge whether the road surface appears in multiple rows of the slice image. If the arithmetic processing device judges that the road surface appears in a given row, a row lower than the given row may be treated as the one in which the road surface appears without performing judgment processing.

The arithmetic processing device may judge that the road surface appears when the number of effective pixels having pixel values included in a predetermined range among multiple pixels constituting a single row is larger than a predetermined number.

In an embodiment, the predetermined range may be dynamically changed. The image sensor receives disturbance light (noise) such as sunlight or the like in addition to the reflected light of the illumination light. Accordingly, by changing the predetermined range according to an ambient environment, false judgement due to noise can be prevented.

In a case in which slice sensing is executed for a slice in which a wide object exists such as a pedestrian bridge, a tunnel, a bridge, or the like, there is a possibility that a row in which the wide object appears among the slice images acquired as a result is erroneously judged to be a road surface. Accordingly, in an embodiment, the arithmetic processing device may exclude a row upper than a reference row from a judgment target. The reference row may be determined according to a horizontal line. Accordingly, false detection of the road surface can be prevented.

In an embodiment, the image sensor may be a multi-tap image sensor having multiple charge accumulation regions, and the gating camera may sense multiple adjacent slices in parallel using the multiple charge accumulation regions.

In an embodiment, multiple slice images acquired in parallel in one sensing may be read out with the same size.

In an embodiment, the multiple slice images acquired in parallel in one sensing may be read out with different sizes.

In an embodiment, the arithmetic processing device may calculate a distance to an object appearing in each pixel based on pixel values of two adjacent slice images. For a row judged to include a road surface in a slice image of a given slice, the processing may be simplified at the time of sensing of a slice that is two or more farther from the given slice. Accordingly, it is possible to prevent loss of information required to generate distance information.

2. A gating camera according to an embodiment divides a field of view in a depth direction into multiple slices, and generates multiple slice images that correspond to the multiple slices. The gating camera includes: an illumination apparatus configured to emit illumination light to the field of view; an image sensor; and a camera controller configured to control light emission of the illumination apparatus and exposure of the image sensor so as to alternately repeat a forward scan for sensing from a near-distance slice toward a far-distance slice, and a reverse scan for sensing from a far-distance slice toward a near-distance slice, and configured to control the illumination apparatus such that an intensity of the illumination light increases with time in the forward scan and the intensity of the illumination light decreases with time in the reverse scan.

With the configuration, as the slice becomes farther, the intensity of the illumination light becomes higher. Accordingly, the number of light emissions and exposures required to generate an image of a farther slice can be reduced, thereby improving the frame rate.

In this case, when the multiple slices are always scanned in the same direction (for example, from a nearer side to a farther side), at the time of transition from one frame to the next frame, that is, at the time of transition from a farthest slice to a nearest slice, the intensity of the illumination light generated by the illumination apparatus changes sharply.

In a case in which the illumination light is infrared, the illumination light is not perceived by the human eye. However, considering the influence on a sensor other than the present gating camera, a steep change in intensity is not preferable. In this regard, in the present embodiment, a steep change in intensity of the illumination light at the time of transition from one frame to the next frame is prevented, and thus an adverse effect on the other sensors is reduced.

In a case in which the illumination apparatus has a low response speed, this leads to long settling time for greatly changing the intensity of the illumination light, which may lead to a decrease in the frame rate. In contrast, in an embodiment, a steep change in intensity of the illumination light at the time of transition from one frame to the next frame is prevented, and thus a decrease in the frame rate is prevented.

In an embodiment, the gating camera may scan one slice group of an odd-numbered slice group and an even-numbered slice group among the multiple slices in the forward scan, and may scan the other slice group of the odd-numbered slice group and the even-numbered slice group among the multiple slices in the reverse scan.

In an embodiment, the camera controller may embed a light emission instruction of the illumination apparatus and a command value of a light emission intensity of the illumination apparatus in the same control signal, and transmit the control signal to the illumination apparatus. Accordingly, an increase of the number of control lines can be prevented.

In an embodiment, the control signal may include a command value of a light emission intensity of the next slice between a light emission instruction in a given slice and a light emission instruction in the next slice. By employing a blank period between the light emission and the light emission timing, the command value of the light emission intensity can be transmitted.

3. A gating camera according to an embodiment divides a field of view in a depth direction into multiple slices, and generates multiple slice images that correspond to the multiple slices. The gating camera includes: an illumination apparatus configured to emit illumination light to the field of view; an image sensor; a camera controller configured to switch a first scan to an M-th scan (M≥2) and to control light emission of the illumination apparatus and exposure of the image sensor such that boundaries of multiple slices in each of the first scan to the M-th scan are shifted by 1/M slice in the depth direction; and an arithmetic processing device configured to generate an image of a sub-slice that is a range obtained by dividing each slice into M portions in the depth direction by processing a first slice image group to an M-th slice image group acquired in the first scan to the M-th scan.

Description will be made assuming that, in a case in which the field of view is divided into (M×N) slices for scanning, the exposure is required to be executed a predetermined X times per slice. In a case in which the same field of view is divided into N slices for scanning, a depth of one slice is M times larger. Accordingly, light emission time of the illumination light and exposure time of the image sensor can be increased. As a result, the amount of received light of the image sensor increases, and the number of exposures per slice can be reduced to be smaller than X. Further, the time (frame period) required to scan N slices can be reduced, and the frame rate can be increased. In M scans, the slices are overlapped to generate a slice image group, and M slice image groups acquired in the M scans are subjected to arithmetic processing to generate the image of the sub-slice. This allows a resolution to be maintained in the same depth direction as that of the M×N slices.

In an embodiment, M=2. Also, the camera controller may be capable of switching between the first scan and a second scan.

In an embodiment, the light emission time of the illumination light may be greater than ½ the exposure time of the image sensor, and may be equal to or less than the exposure time. The arithmetic processing device may generate the image of the sub-slice based on two consecutive slice images generated in the first scan and two consecutive slice images generated in the second scan.

In an embodiment, the light emission time of the illumination light is ½ or less of the exposure time of the image sensor, and the arithmetic processing device generates the image of the sub-slice based on a single slice image acquired in the first scan and a single slice image acquired in the second scan.

In an embodiment, the light emission time of the illumination light is twice the exposure time of the image sensor, and the arithmetic processing device may generate the image of the sub-slice based on three consecutive slice images acquired in the first scan and three consecutive slice images acquired in the second scan.

EMBODIMENTS

Description will be made with reference to the drawings regarding preferred embodiments. The same or similar components, members, and processes shown in the drawings are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

Embodiment 1

FIG. 1 is a block diagram of a sensing system 10 according to Embodiment 1. The sensing system 10 is mounted on a vehicle such as an automobile, a motorcycle, or the like, and detects an object OBJ existing around the vehicle.

The sensing system 10 mainly includes a gating camera 100. The gating camera 100 includes an illumination apparatus 110, an image sensor 120, a camera controller 130, and an arithmetic processing device 140. The imaging by the gating camera 100 is performed by dividing a field of view into multiple (N, N≥2) slices $RNG_1$ to $RNG_N$ in a depth direction. Adjacent slices may overlap each other in the depth direction at a boundary therebetween.

The entire field of view, that is, the sensing of all the slices $RNG_1$ to $RNG_N$, is defined as one frame. Therefore, in the present specification, the term "frame rate" represents the number of frames that can be imaged per unit time (1 second).

The illumination apparatus 110 emits illumination light L1 in a field of view in front of the vehicle in synchronization with a light emission timing signal S1 supplied from the camera controller 130. The illumination light L1 is preferably infrared light, but the present invention is not limited thereto, the illumination light L1 may be visible light or ultraviolet light having a predetermined wavelength.

The image sensor 120 includes multiple pixels, is capable of exposure control in synchronization with an exposure timing signal S2 supplied from the camera controller 130, and generates an image (RAW image) including multiple pixels. The image sensor 120 is sensitive to the same wavelength as that of the illumination light L1, and images reflected light (return light) L2 reflected by the object OBJ. A slice image $IMG_i$ generated by the image sensor 120 with respect to an i-th slice $RNG_i$ is referred to as an image IMG (or a primary image) as necessary so as to be distinguished from a final output image IMGf of the gating camera 100. The output image IMGf may be a set of multiple slice images, and may be a single piece of image data obtained by synthesizing the multiple slice images.

The camera controller 130 controls an emission timing (light emission timing) of the illumination light L1 by the illumination apparatus 110 and an exposure timing by the image sensor 120. The camera controller 130 is implemented as a combination of a processor (hardware) such as a central processing unit (CPU), a micro processing unit (MPU), a microcontroller, or the like, and a software program to be executed by the processor (hardware).

The image IMG generated by the image sensor 120 is input to the arithmetic processing device 140. The arithmetic processing device 140 processes multiple slice images $IMG_1$ to $IMG_N$ acquired for the multiple slice $RNG_1$ to $RNG_N$. The arithmetic processing device 140 may be implemented in the same hardware as the camera controller 130 or may be configured by separate hardware. Alternatively, some or all of the functions of the arithmetic processing device 140 may be implemented as a processor or a digital circuit built into the same module as that of the image sensor 120.

The above is the basic configuration of the gating camera 100. Next, description will be made regarding the operation of the imaging camera 100.

Figure 2:
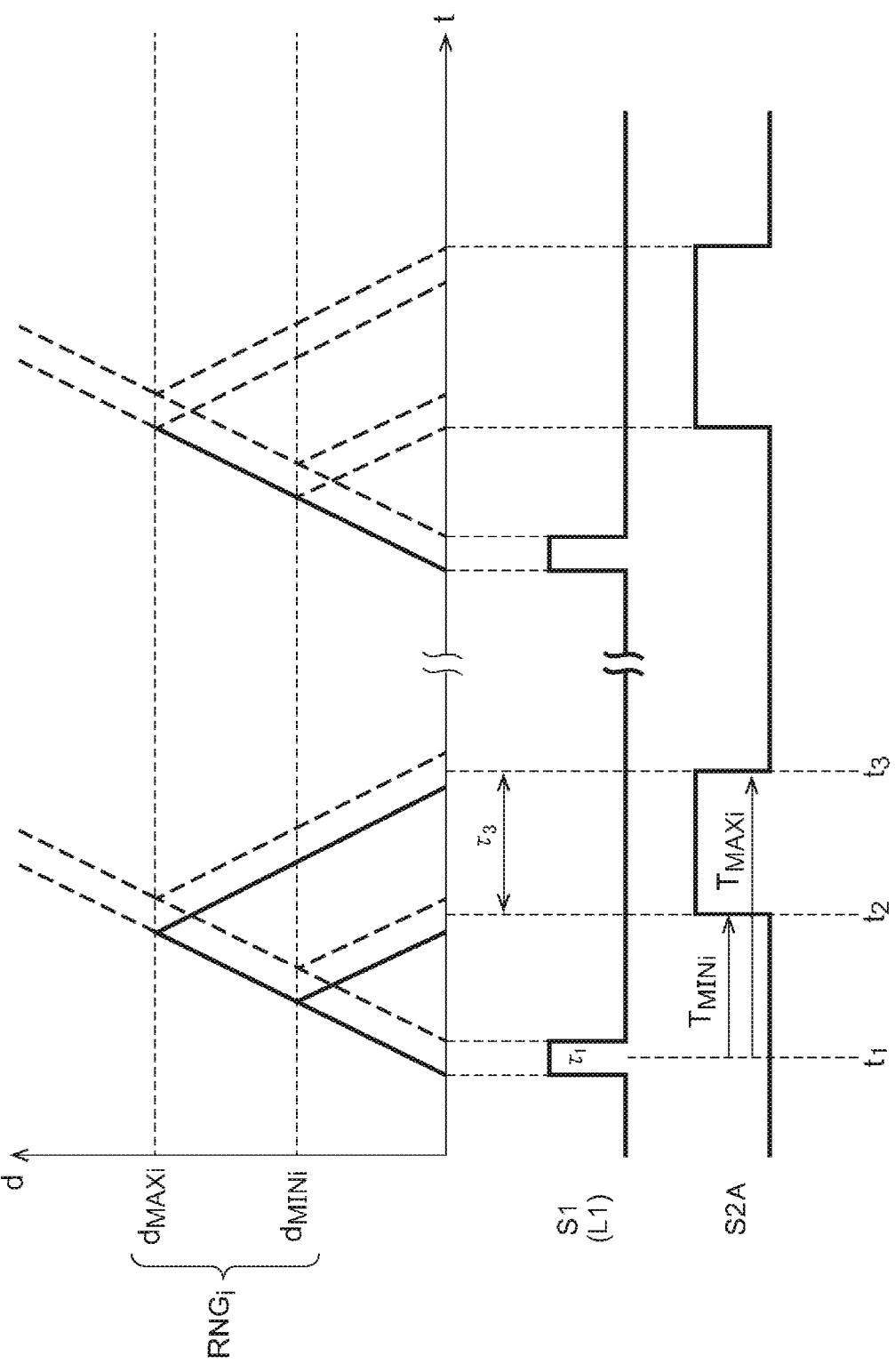
FIG. 2 illustrates a basic operation of a gating camera.

FIG. 2 illustrates a basic operation of the gating camera 100. FIG. 2 illustrates the operation when the i-th slice $RNG_i$ is sensed. The illumination apparatus 110 emits light during a light emitting period $\tau_1$ between time points $t_o$ to $t_1$ in synchronization with the light emission timing signal S1. In the upper diagram of FIG. 2, a light beam diagram is shown with the horizontal axis as time and with the vertical axis as distance. A distance between the gating camera 100 and a near-distance boundary of the slice $RNG_i$ is represented by $d_{MINi}$, and a distance between the gating camera 100 and a far-distance boundary of the slice $RNG_i$ is represented by $d_{MAXi}$.

FIG. 2 illustrates a basic operation of the gating camera 100. FIG. 2 illustrates the operation when the i-th slice $RNG_i$ is sensed. The illumination apparatus 110 emits light during a light emitting period $\tau_1$ centered on the time point $t_1$ in synchronization with the light emission timing signal S1. In the upper diagram of FIG. 2, a light beam diagram is shown with the horizontal axis as time and with the vertical axis as distance. A distance between the gating camera 100 and a near-distance boundary of the slice $RNG_i$ is represented by $d_{MINi}$, and a distance between the gating camera 100 and a far-distance boundary of the slice $RNG_i$ is represented by $d_{MAXi}$. The depth of the slice $RNG_i$ is represented by $L=d_{MAXi}-d_{MINi}$.

The round-trip time $T_{MINi}$, which is a period from the departure of light from the illumination apparatus 110 at a given time point, to the arrival of the light at the distance $d_{MINi}$, up to the return of the reflected light to the image sensor 120, is represented by $T_{MINi}=2\times d_{MINi}/c$. Here, c represents the speed of light.

Similarly, the round-trip time $T_{MAXi}$, which is a period from the departure of light from the illumination apparatus 110 at a given time point, to the arrival of the light at the distance $d_{MAXi}$, up to the return of the reflected light to the image sensor 120, is represented by $T_{MAXi}=2\times d_{MAXi}/c$.

When only the object OBJ included in the slice $RNG_i$ is imaged, the camera controller 130 generates the exposure timing signal S2 so as to start the exposure at the time point $t_2 = t_1 + T_{MINi}$ and end the exposure at the time point $t_3 = t_1 + T_{MAXi}$. This is a single exposure operation.

The exposure time $\tau_3$ is represented by $\tau_3 = t_3 - t_2 = T_{MAXi} - T_{MINi} = 2 \times (d_{MAXi} - d_{MINi})/c$, which is proportional to the depth L of the slice $RNG_i$. Also, the light emission time $\tau_1$ may be determined within a range that does not exceed the exposure time $\tau_3$.

$$\tau_1 \leq \tau_3$$

In this example, the start time $t_2$ and the end time $t_3$ of the exposure are each determined based on the central timing $t_1$ of the light emission time $\tau_1$, but the present invention is not limited to such an arrangement. Also, the start time $t_2$ and the end time $t_3$ of the exposure may be each determined based on the light emission start time $t_0 - \tau_1/2$ and may be each determined based on the light emission end time $t_0 + \tau_1/2$.

The sensing of the i-th slice $RNG_i$ may include multiple sets of light emission and exposure. In this case, preferably, the camera controller 130 may repeatedly execute the above exposure operation multiple times at a predetermined period.

For example, in a case in which the image sensor 120 is capable of multiple exposures, the reflected light generated in multiple light emissions may be accumulated in a charge accumulation region for each pixel so as to generate a single slice image.

In a case in which multiple exposures are not used, when a given slice $RNG_i$ is sensed, an image $IMG_{ij}$ may be generated for each set of light emission and exposure. Furthermore, m images $IMG_{i1}$ to $IMG_{im}$ acquired in multiple (m) sets may be synthesized by the arithmetic processing device 140 so as to generate a single slice image $IMG_i$.

Figures 3A, 3B:
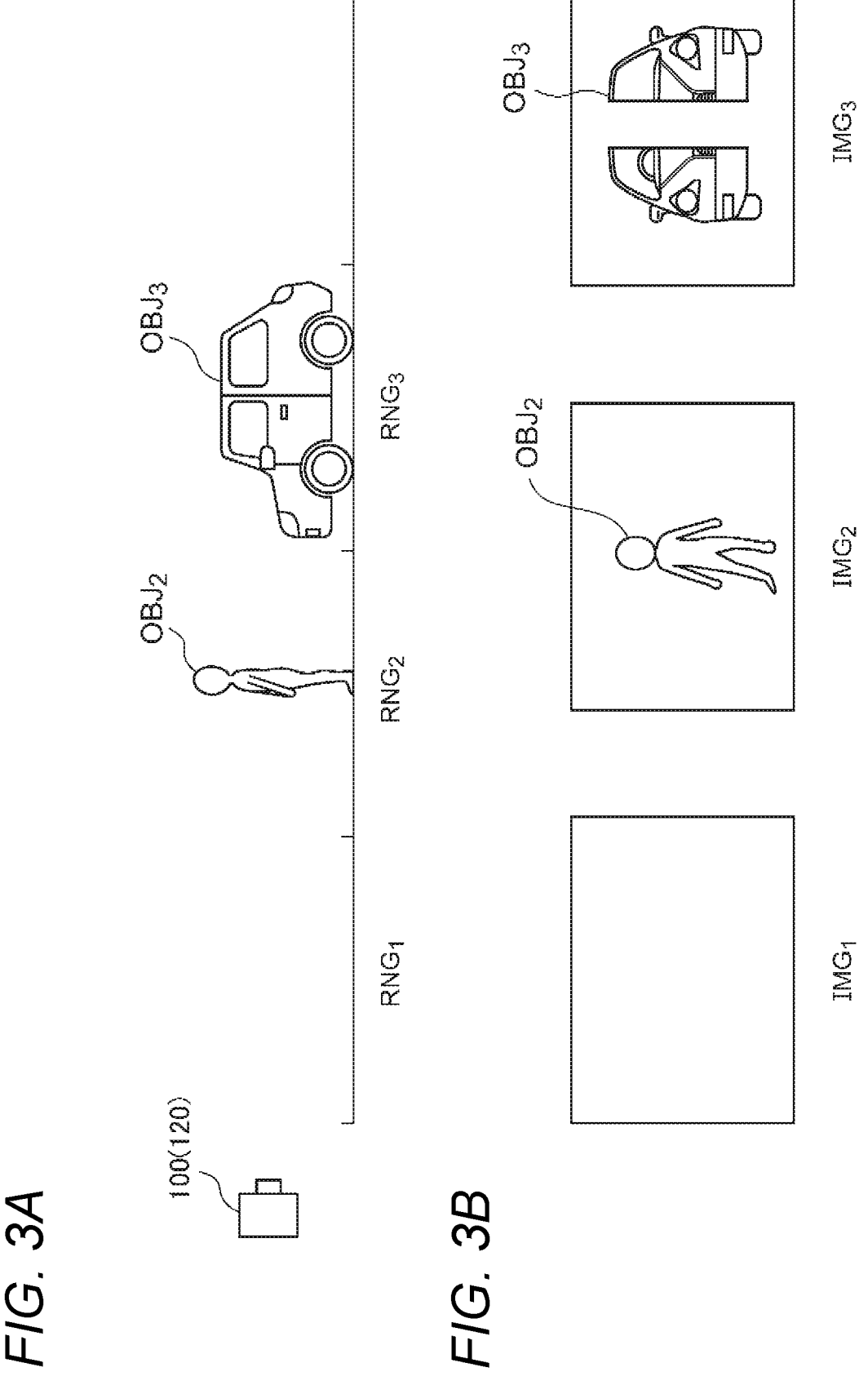
FIG. 3A and FIG. 3B illustrate slice images generated by the gating camera.

FIG. 3A and FIG. 3B illustrate slice images generated by the gating camera 100. In an example shown in FIG. 3A, an object (pedestrian) $OBJ_2$ exists in a slice $RNG_2$, and an object (vehicle) $OBJ_3$ exists in a slice $RNG_3$. FIG. 3B illustrates multiple slice images $IMG_1$ to $IMG_3$ acquired in the situation shown in FIG. 3A. When the slice image $IMG_1$ is captured, the image sensor is exposed by only the reflected light from the slice $RNG_1$, and thus no object image appears in the slice image $IMG_1$.

When the slice image $IMG_2$ is captured, the image sensor is exposed by only the reflected light from the slice $RNG_2$, and thus only an image of the object $OBJ_2$ appears in the slice image $IMG_2$. Similarly, when the slice image $IMG_3$ is captured, the image sensor is exposed by only the reflected light from the slice $RNG_3$, and thus only an image of the object $OBJ_3$ appears in the slice image $IMG_3$. As described above, with the gating camera 100, an object can be separately imaged for each slice.

In a case in which the gating camera 100 is used as an in-vehicle sensor, a frame rate as high as possible is required. In a case in which the multiple slices $RNG_1$ to $RNG_N$ are sensed, when the same processing is executed for all the rows of all the slices, the time required to generate the slice images $IMG_1$ to $IMG_N$ for all the slices becomes long, leading to a decrease in the frame rate. Description will be made below regarding a technique for improving the frame rate.

Figure 4:
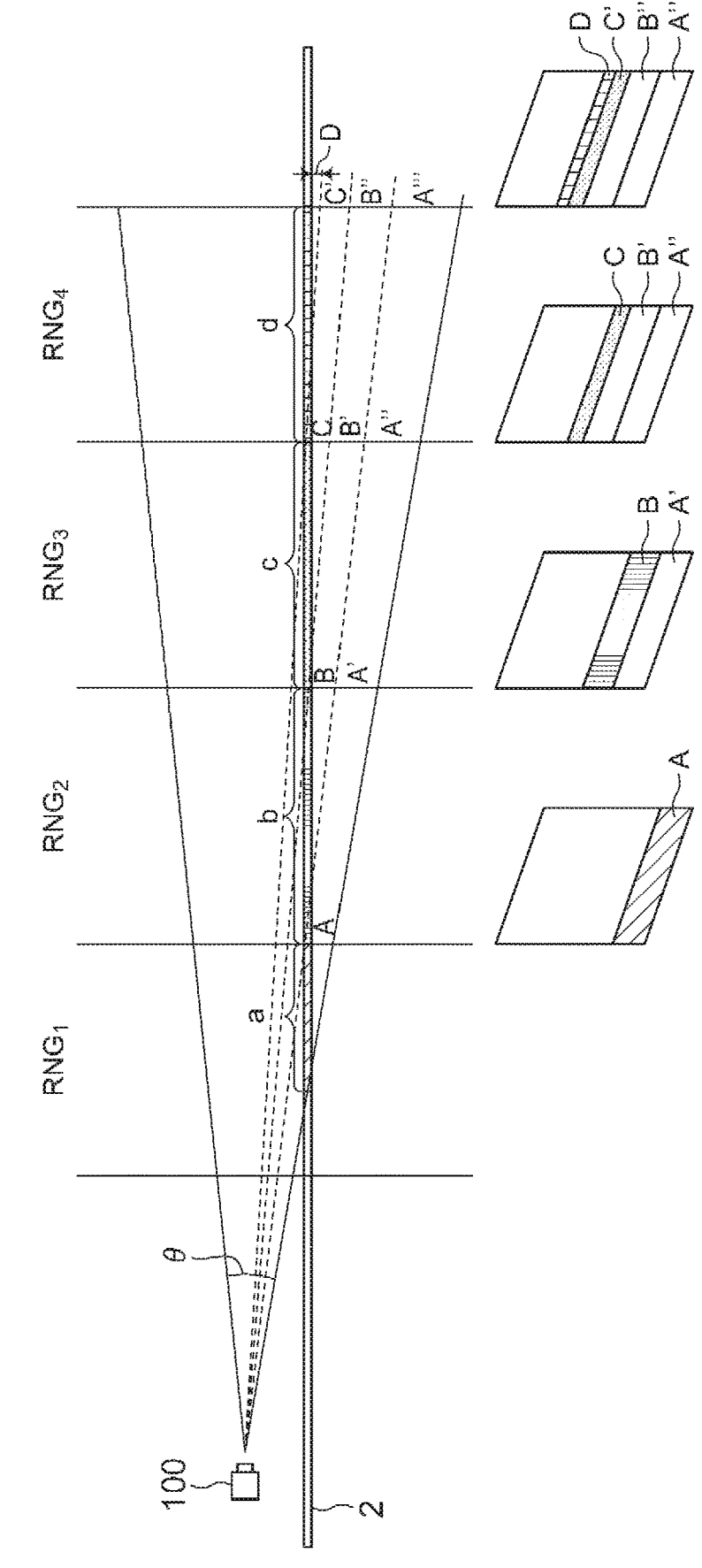
FIG. 4 illustrates characteristics of sensing by the gating camera.

As a result of investigating the sensing by the gating camera 100, the present inventors have recognized the following characteristics. FIG. 4 illustrates characteristics of the sensing by the gating camera 100. The gating camera 100 is provided on a road surface 2.

As shown in FIG. 4, description will be made regarding a case in which multiple (four in this example) slices $RNG_1$ to $RNG_4$ are imaged by the gating camera 100 at the same angle of view $\theta$ in a vertical direction. For the nearest slice $RNG_1$, a road surface a appears in a region A of the slice image $IMG_1$.

For the second slice $RNG_2$ from the near side, a road surface b appears in a region B of the slice image $IMG_2$.

Similarly, for the third slice $RNG_3$ from the near side, a road surface c appears in a region C of the slice image $IMG_3$, and for the farthest slice $RNG_4$, a road surface d appears in a region D of a slice image $IMG_4$.

Here, when the second to fourth slices are sensed, the reflected light from the road surface a is not incident on the image sensor 120. Accordingly, it is extremely unlikely that regions A', A'', and A' that correspond to the road surface a of the slice images $IMG_2$ to $IMG_4$ include significant information.

Similarly, when the third to fourth slices are sensed, the reflected light from the road surface b is not incident on the image sensor 120. Therefore, it is extremely unlikely that regions B' and B'' that correspond to the road surface b of the slice images $IMG_3$ and $IMG_4$ include significant information.

Similarly, when the fourth slice is sensed, the reflected light from the road surface c is not incident on the image sensor 120. Therefore, it is extremely unlikely that a region C' that corresponds to the road surface c of the slice image $IMG_4$ includes significant information.

That is to say, assuming that reflection from a road surface is detected in a given row of a slice image obtained by sensing a given slice, in principle, reflected light cannot be incident on the same row of a slice image obtained by sensing a slice farther than the given slice. In the present embodiment, the property is used to simplify the processing for a row (region) on which reflected light is not incident.

Return to FIG. 1. In the present embodiment, the camera controller 130 controls the light emission timing of the illumination apparatus 110 and the exposure timing of the image sensor 120 so as to generate the slice images $IMG_1$ to $IMG_N$ from the near slice $RNG_1$ to the far slice $RNG_N$. Accordingly, the slice images of the far slices are sequentially input to the arithmetic processing device 140 from the slice images of the near slices.

The arithmetic processing device 140 judges whether the road surface appears for each of the slice images IMG generated in sequence. The gating camera 100 simplifies the processing for a row judged to include a road surface in a slice image of a given slice $RNG_i$ when a slice $RNG_j$ (j>i) farther than the given slice is sensed. Information S3 on the row judged to include the road surface is supplied to an execution subject of the processing to be simplified or to a block that controls the execution subject.

Next, description will be made regarding a simplified example of the processing by the gating camera 100 with reference to the drawings.

Figures 5A, 5B:
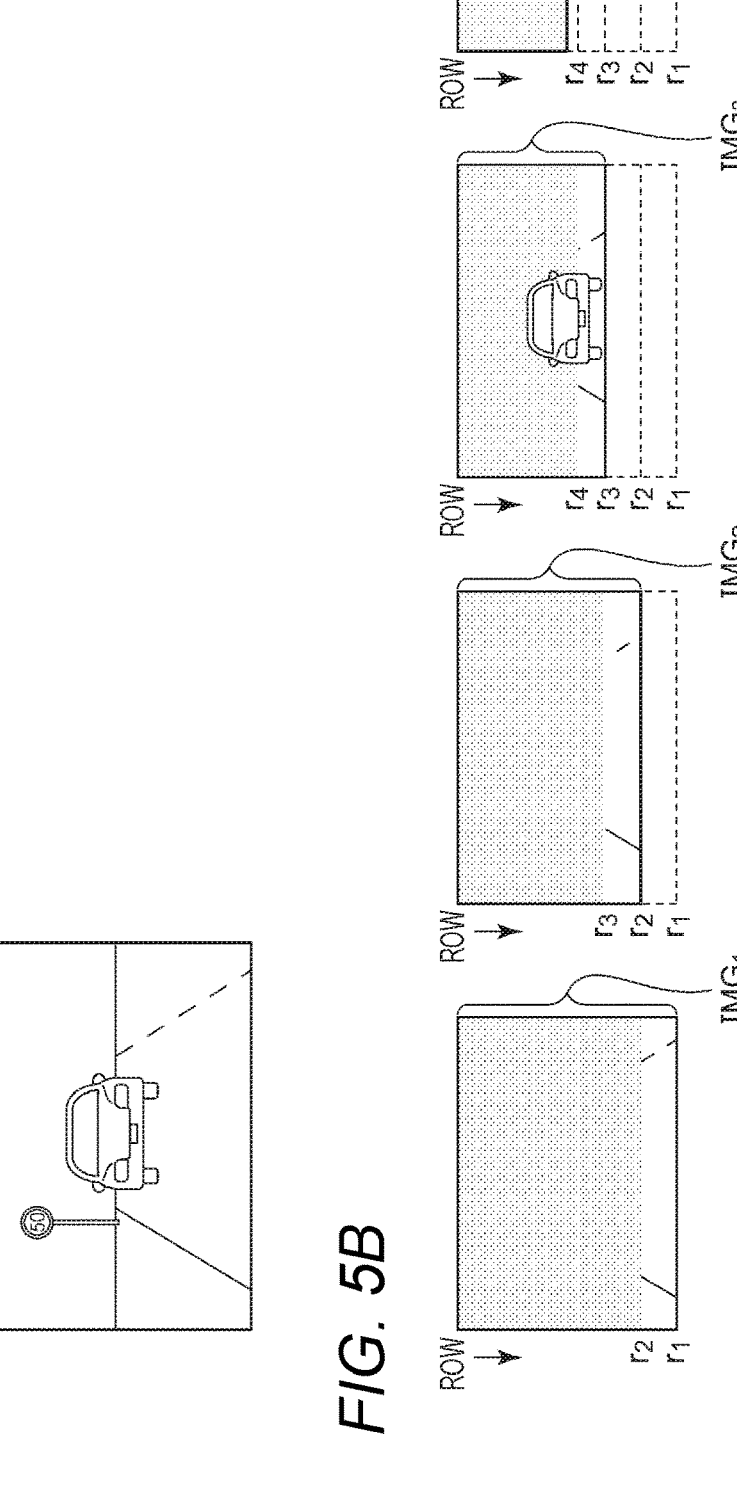
FIG. 5A illustrates a driving scene.
FIG. 5B illustrates multiple slice images generated in the driving scene illustrated in FIG. 5A.

FIG. 5A illustrates a driving scene, FIG. 5B illustrates multiple slice images generated in the driving scene illustrated in FIG. 5A. Here, the number N of slices is 4.

The slice image $IMG_1$ generated by sensing the nearest slice $RNG_1$ includes a road surface in a lower region. The arithmetic processing device 140 processes the slice image $IMG_1$, and judges that the road surface appears in multiple rows $r_1$ to $r_2$.

In the sensing of the second slice $RNG_2$, the processing is simplified for rows $r_1$ to $r_2$ judged to include the road surface. In the present embodiment, row processing is simplified by skipping reading of a row in the image sensor 120. That is to say, in the sensing of the second slice $RNG_2$, the rows $r_1$ to $r_2$ are not read out. Accordingly, the generated slice image $IMG_2$ is an image cropped so as not to include the rows $r_1$ to $r_2$. In FIG. 1, the information S3 supplied from the arithmetic processing device 140 to the image sensor 120 designates a row to be skipped.

Subsequently, the arithmetic processing device 140 processes the slice image $IMG_2$, and judges that the road surface appears between rows $r_2$ to $r_3$.

In the sensing of the third slice $RNG_3$, the processing is simplified for the rows $r_1$ to $r_2$ and $r_2$ to $r_3$ judged to include the road surface. That is to say, in the sensing of the third slice $RNG_3$, the rows $r_1$ to $r_3$ are not read out. Accordingly, the generated slice image IMG 3 is an image cropped so as not to include the rows $r_1$ to $r_3$.

The arithmetic processing device 140 processes the slice image $IMG_3$, and judges that the road surface appears between the rows $r_3$ to $r_4$.

In the sensing of the fourth slice $RNG_4$, the processing is simplified for the rows $r_1$ to $r_2$, $r_2$ to $r_3$, and $r_3$ to $r_4$ judged to include the road surface. That is to say, in the sensing of the fourth slice $RNG_4$, the rows $r_1$ to $r_4$ are not read out. Accordingly, the generated slice image $IMG_4$ is an image cropped so as not to include the rows $r_1$ to $r_4$.

The above is the operation of the gating camera 100. With the gating camera 100, as the slice becomes farther, the number of rows of the slice image becomes smaller. Accordingly, the time required for generating and transmitting a single slice image is shortened. Accordingly, the time required to generate slice images of all the slices can be shortened, and the frame rate can be improved.

Figure 6:
FIG. 6 illustrates a configuration example of an image sensor.

FIG. 6 illustrates a configuration example of the image sensor 120. The image sensor 120 includes a pixel array 122, a vertical scanning circuit 124, and a readout circuit 126.

The pixel array 122 has a resolution of x×y, and includes multiple (y) selection control lines (vertical scanning lines) SEL1 to SELy, multiple (x) output signal lines OUT1 to OUTx, and multiple (x×y) pixels provided at intersections of the multiple (x) output signal lines OUT1 to OUTx and the multiple (y) selection control lines SEL1 to SELy. Taking a complementary metal oxide semiconductor (CMOS) image sensor as an example, each pixel may include a photodiode, and a pixel circuit including a charge storage element (capacitor and floating diffusion FD) and several transistors. During the exposure, the photodiode and the charge storage element are connected by the pixel circuit, and the charge corresponding to the amount of received light is stored in the charge storage element.

Figure 7A:
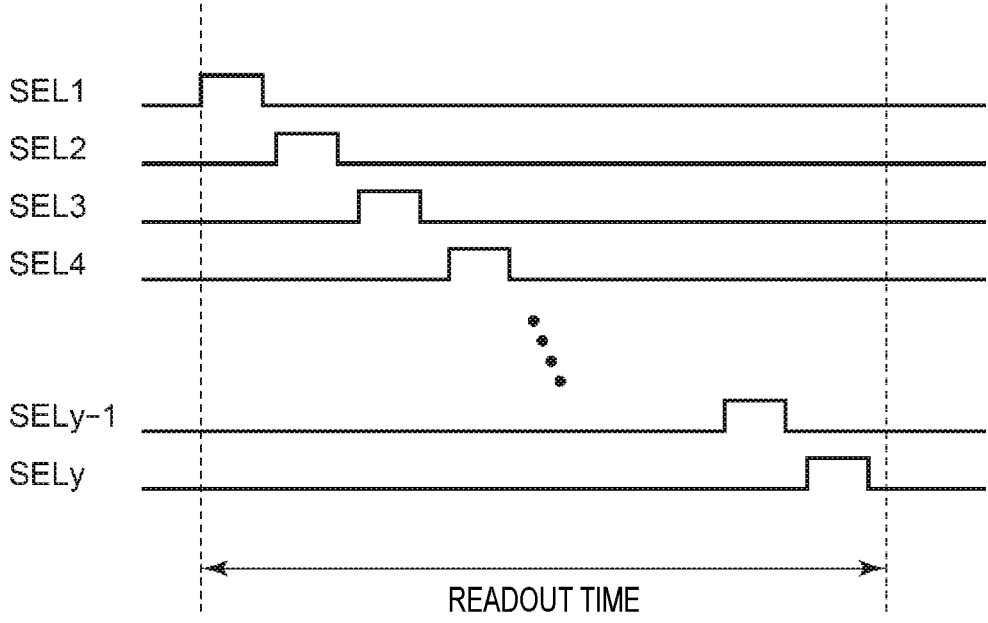
FIG. 7A and FIG. 7B illustrate image reading by the image sensor.
Figure 7B:
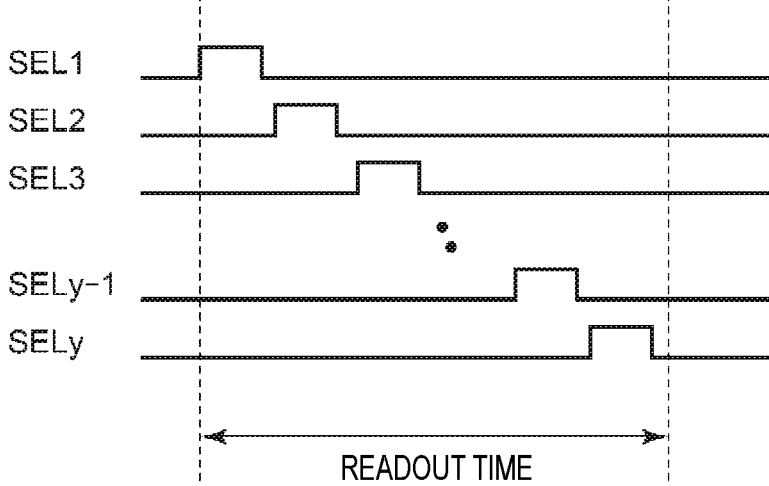

FIG. 7A and FIG. 7B illustrate image reading by the image sensor 120. In general, as shown in FIG. 7A, the vertical scanning circuit 124 sequentially selects the multiple selection control lines SEL1 to SELy. When a selection control line SEL of a given row is enabled, the charge storage element is connected to the corresponding output signal line OUT in a pixel of the given row, and a voltage of the charge storage element is read out by the readout circuit 126.

The time required to read out a single image IMG is the sum of the reading times for all the rows. In an example, in order to reduce the readout time of an image, the reading of a row that is likely to include no significant information is skipped. FIG. 7B illustrates skipping of reading of a row. For example, in a case in which the reading of a j-th row is skipped, a j-th selection control signal SELj is not selected. In a case in which k rows among y rows are skipped, the reading time can be reduced by approximately (y−k)/y times. As described above, by skipping the reading of the row, the time required to generate a single slice image can be reduced, and the frame rate can be improved.

Next, description will be made regarding a processing for judging whether a road surface appears in the slice image.

For example, the arithmetic processing device 140 may judge whether a road surface appears in multiple rows of the slice image IMG, and judges whether the road surface appears in each row. When judgment conditions are satisfied over multiple adjacent rows, the arithmetic processing device 140 may judge that the road surface appears in the multiple rows.

In this case, when it is judged that the road surface appears in a given row, a row lower that the given row may be treated as the one in which the road surface appears without performing the judgment processing. Accordingly, the time required for the judgment can be shortened.

Description will be made regarding the judgment conditions.

For example, the arithmetic processing device 140 may judge that the road surface appears when the number of effective pixels having pixel values included in a predetermined range among multiple (x) pixels constituting a single row is larger than a predetermined number. For the predetermined range, only a lower limit value may be determined, or a lower limit value and a upper limit value may be determined. The predetermined number may be determined to be larger than 0.6 times a horizontal resolution x. More preferably, the predetermined number may be set to about 0.8 times the horizontal resolution x.

Furthermore, it may be added to the judgment conditions that a variation of the pixel values within the predetermined range is smaller than a predetermined value.

Here, not only the reflected light but also disturbance noise such as sunlight or the like is incident on the image sensor 120. In a case in which the vehicle travels toward the sun, there is a possibility that, due to large disturbance noise, false judgement is made that the road surface appears in the given row. Therefore, the predetermined range may preferably be dynamically changed according to a driving scene. In a case in which the disturbance noise is large, the lower limit value of the predetermined range may be relatively increased. In a case in which the disturbance noise is small, the lower limit value may be relatively decreased.

Figure 8:
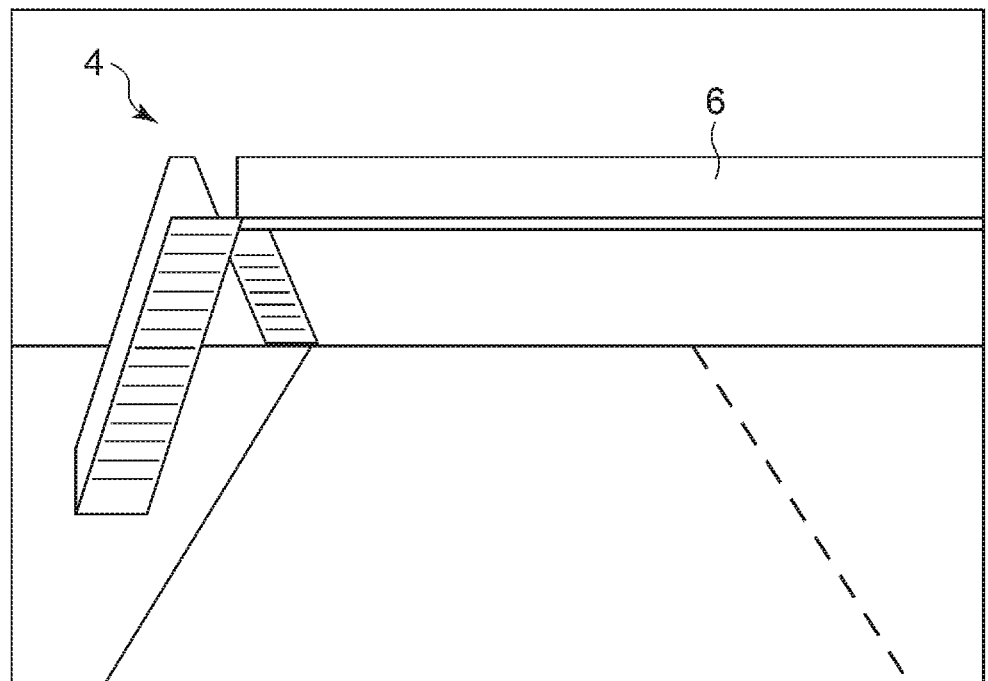
FIG. 8 illustrates another example of the driving scene.

FIG. 8 illustrates another example of the driving scene. In the driving scene, a pedestrian bridge 4 exists in front of the gating camera 100. In the scene, when a slice including a bridge portion 6 of the pedestrian bridge 4 is sensed, there is a possibility that a row including the bridge portion 6 satisfies the judgment conditions of the road surface, and the row is falsely judged to be the road surface. The problem may occur when passing through a tunnel or a bridge in addition to a pedestrian bridge. In a row including a wide object such as a pedestrian bridge, there is a possibility that a target to be detected exists at different positions in a left-right direction of the same row. Therefore, it is not preferable to simplify the processing for such a row.

Accordingly, in order to prevent the false judgement, the arithmetic processing device 140 may exclude a row upper than a reference row from a judgment target. The reference row may be determined according to a horizontal line. Accordingly, false detection of the road surface can be prevented.

Description will be made regarding modifications relating to Embodiment 1.

(Modification 1.1)

The image sensor 120 is a multi-tap image sensor having multiple floating diffusion (charge accumulation region) FDs for each pixel, and can individually control the exposure timing for each pixel.

Figures 9A, 9B:
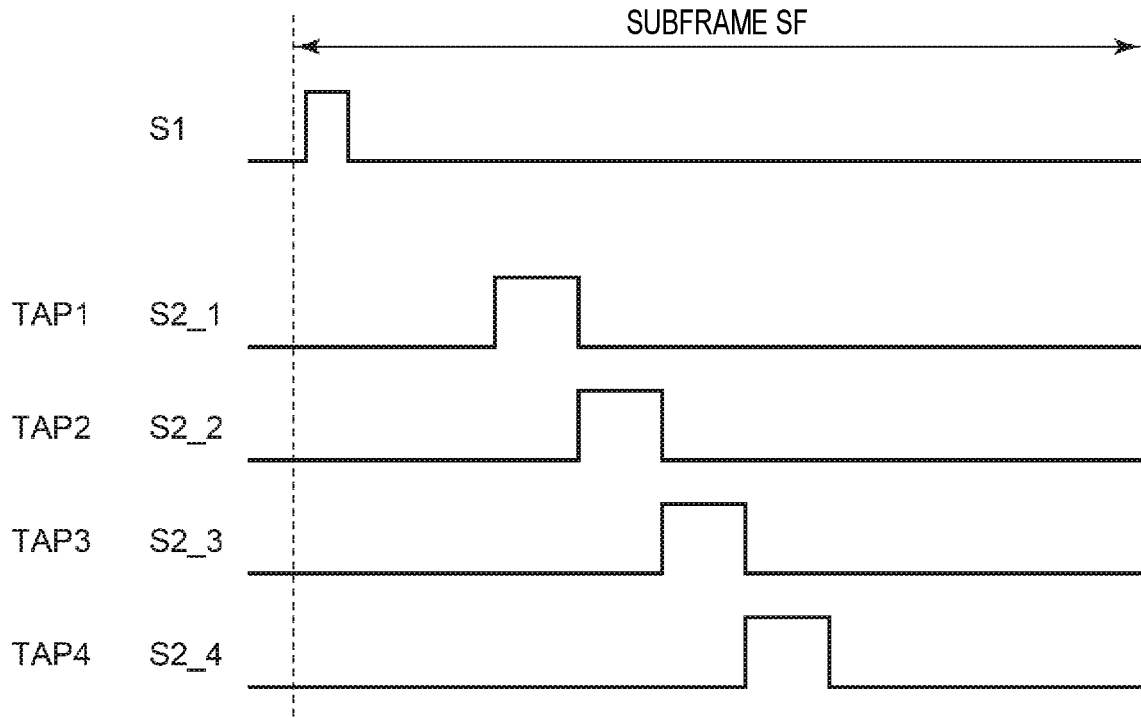
FIG. 9A and FIG. 9B illustrate operation of the gating camera when a multi-tap image sensor is used.

FIG. 9A and FIG. 9B illustrate operation of the gating camera 100 when the multi-tap image sensor is used. Description will be made below regarding an example of a 4-tap image sensor having four floating diffusions FD1 to FD4. FIG. 9A illustrates single sensing operation. A waveform S1 shows the light emission timing of the illumination apparatus 110, and waveforms S2_1 to S2_4 show the exposure timings of four taps TAP1 to TAP4.

In this case, the gating camera 100 is capable of sensing multiple adjacent slices at the same time by capturing exposure results at different timings in the multiple floating diffusion FDs in a single sensing (referred to as a subframe). It should be noted that a single subframe may include multiple sets of light emission and exposure.

As illustrated in FIG. 9B, the sensing of the subframe is repeated multiple times, thereby completing the sensing of all the slices. In a case in which the number of slices n=12 and the number of taps m=4, one frame includes n/m=3 subframes.

Figure 10:
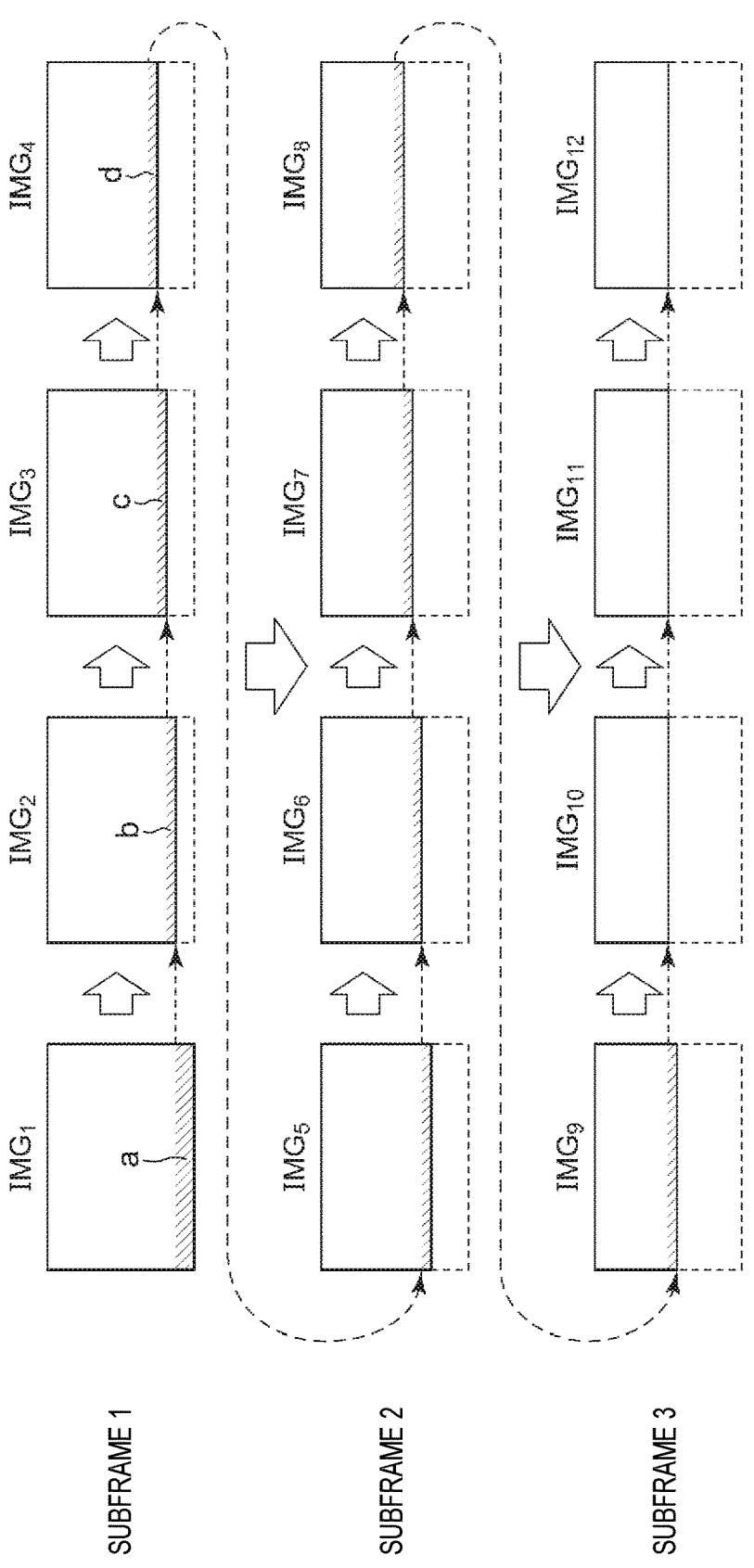
FIG. 10 illustrates a process according to Modification 1.1.

FIG. 10 illustrates a process according to Modification 1.1. In a first subframe, the four slices $RNG_1$ to $RNG_4$ are sensed.

First, the slice image $IMG_1$ of the nearest slice $RNG_1$ is read out with a full size without being cropped from the tap TAP1. The arithmetic processing device 140 processes the slice image $IMG_1$ to judge a row including the road surface. A hatched portion a represents a row judged to be a road surface.

Subsequently, information on the row a judged to be the road surface is supplied to the image sensor 120. The image sensor 120 reads the second slice image $IMG_2$ from the tap TAP2 in a form in which the row a judged to be the road surface is cropped.

The arithmetic processing device 140 processes the slice image $IMG_2$ to judge a row b including the road surface. Subsequently, information on the row b judged to be the road surface is supplied to the image sensor 120. The image sensor 120 reads out the third slice image IMG 3 from the tap TAP3 in a form in which the rows a and b judged to be the road surface in the past are cropped.

The arithmetic processing device 140 processes the slice image $IMG_3$ to judge a row c including the road surface. Subsequently, information on the row c judged to be the road surface is supplied to the image sensor 120. The image sensor 120 reads out the fourth slice image $IMG_4$ from the tap TAP4 in a form in which the rows a, b, and c judged to be the road surface in the past are cropped.

The arithmetic processing device 140 processes the slice image $IMG_4$ to judge a row d including the road surface. Subsequently, information on the row d judged to be the road surface is supplied to the image sensor 120.

Subsequently, in a second subframe, four slices $RNG_5$ to $RNG_8$ are sensed. A slice image $IMG_5$ of the nearest slice $RNG_5$ is read out from the tap TAP1. In this case, the slice image $IMG_5$ is read out in a state in which the rows a to d judged to be the road surface are cropped.

Thereafter, the operation is repeated. As described above, in Modification 1.1, the multiple slice images acquired in parallel in one sensing are read out in the order from the near side with different sizes.

(Modification 1.2)

Figure 11:
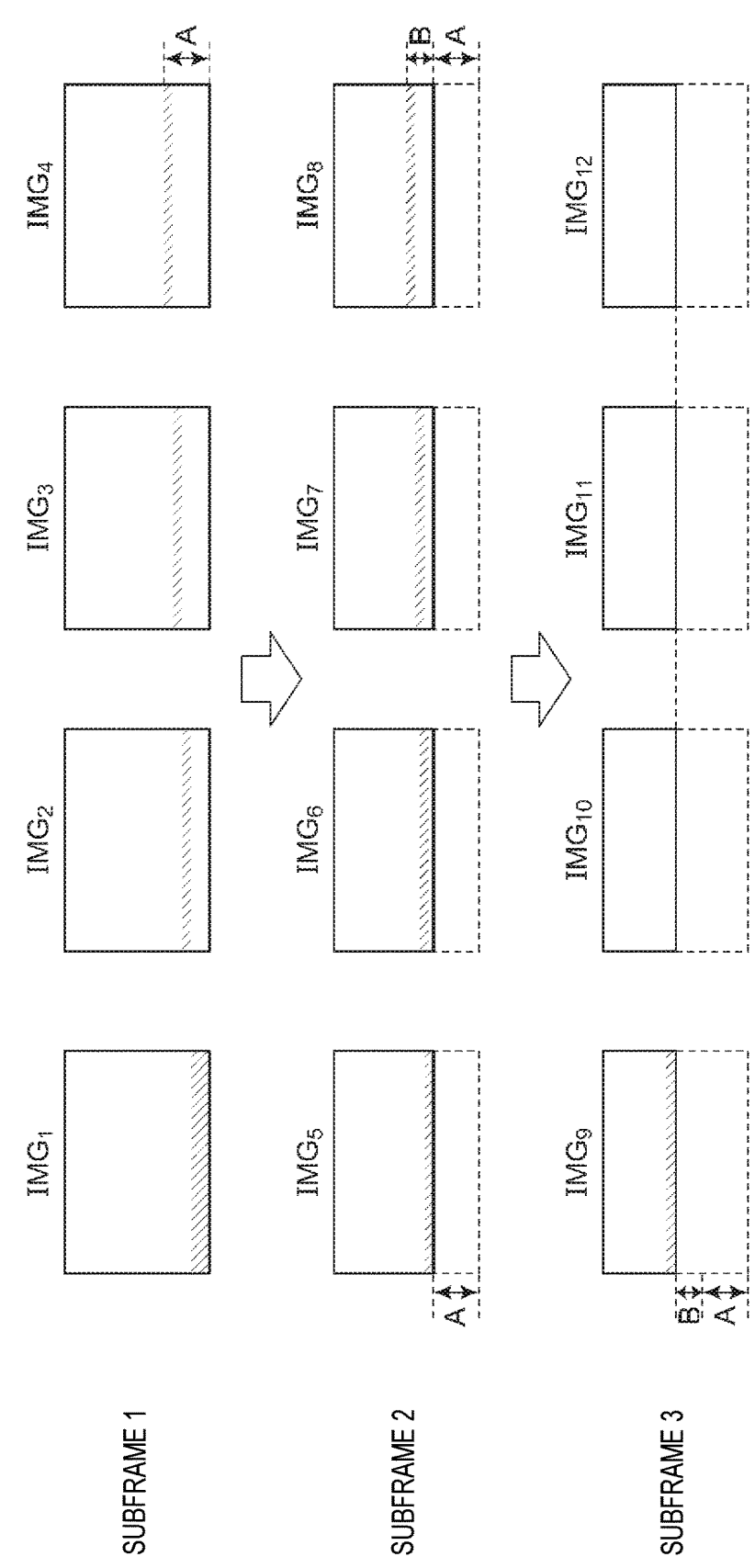
FIG. 11 illustrates a process according to Modification 1.2.

FIG. 11 illustrates a process according to Modification 1.2. In the first subframe, the four slice images $RNG_1$ to $RNG_4$ are sensed to generate the four slice images $IMG_1$ to $IMG_4$. These are not cropped and are read out with a full size.

The arithmetic processing device 140 judges the row including the road surface for the four slice images $IMG_1$ to $IMG_4$. A hatched portion represents a row judged to be a road surface. In the first subframe, it is judged that the road surface appears in a range A.

In the subsequent second subframe, the four slice images $IMG_5$ to $IMG_8$ that correspond to the four slices $RNG_1$ to $RNG_4$ are generated. The slice images $IMG_5$ to $IMG_8$ are cropped and read out so as not to include the region A in which the road surface appears.

The arithmetic processing device 140 judges the row including the road surface for the four slice images $IMG_5$ to $IMG_8$. In the second subframe, it is judged that the road surface appears in a range B.

In a subsequent third subframe, four slice images $IMG_9$ to $IMG_{12}$ that correspond to four slices $RNG_9$ to $RNG_{12}$ are generated. The slice images $IMG_9$ to $IMG_{12}$ are cropped and read out so as not to include the regions A and B in which the road surface appears.

As described above, in Modification 1.2, the multiple slice images in one subframe acquired in parallel by one sensing are read out with the same size.

(Modification 1.3)

In Modification 1.3, the arithmetic processing device 140 calculates a distance to an object included in each pixel based on pixel values of two adjacent slice images. The distance measurement is based on the same principle as that of the indirect TOF method.

In this case, regarding a row judged to include a road surface in a slice image of a given slice $RNG_i$ the processing may be simplified at the time of sensing a slice $RNG_j$ ($j \geq i+2$) that is 2 or more farther from the slice $RNG_i$. Accordingly, it is possible to prevent loss of information required to generate distance information.

(Modification 1.4)

Description has been made above regarding an arrangement in which, as the simplification of the processing for a row including a road surface, the data is not read out. However, the present invention is not limited to such an arrangement. For example, after all the rows are read out and a full-size image is once generated by the image sensor 120, a portion of a row judged to include the road surface in a near-distance slice may be cropped and output (transmitted) to the arithmetic processing device 140. In a case in which the image transmission time from the illumination apparatus 110 to the arithmetic processing device 140 becomes a bottleneck, Modification 1.4 is effective.

Embodiment 2

Figure 12:
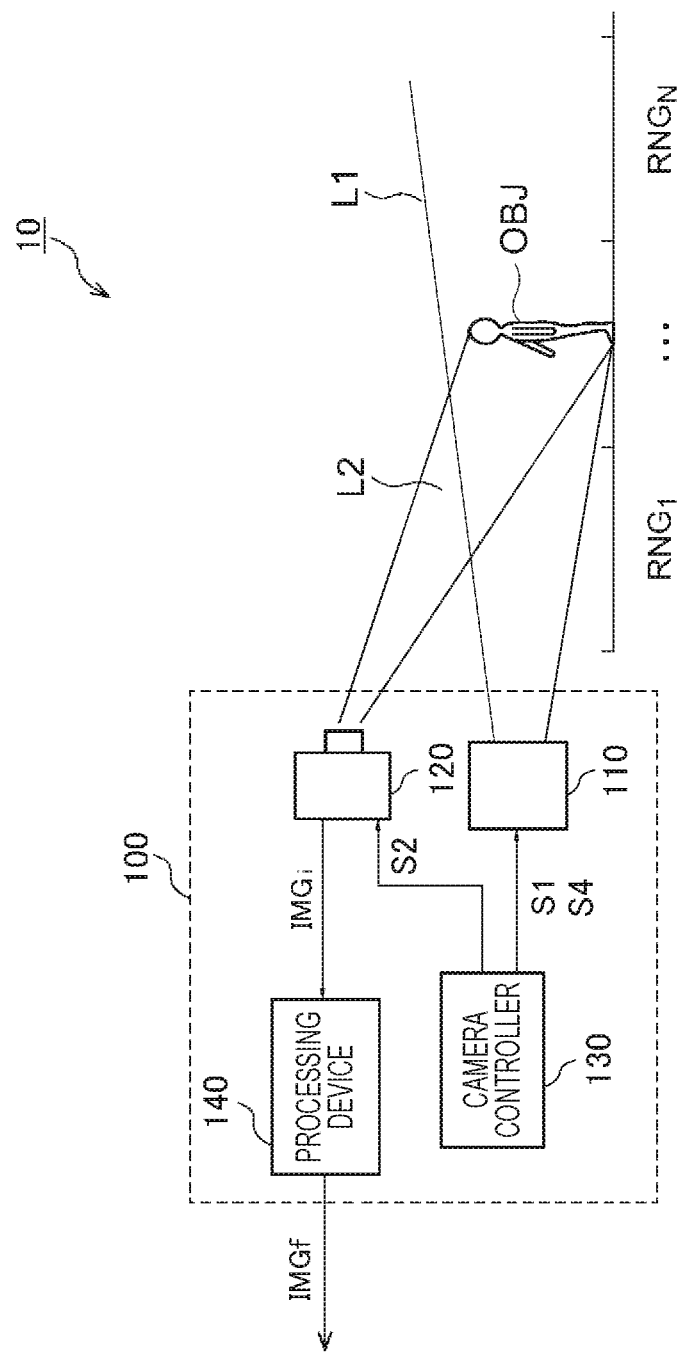
FIG. 12 is a block diagram of a sensing system according to Embodiment 2.

FIG. 12 is a block diagram of a sensing system 10 according to Embodiment 2. The sensing system 10 is mounted on a vehicle such as an automobile, a motorcycle, or the like, and detects an object OBJ existing around the vehicle. The sensing system 10 mainly includes a gating camera 100. The gating camera 100 includes an illumination apparatus 110, an image sensor 120, a camera controller 130, and an arithmetic processing device 140. The imaging by the gating camera 100 is performed by dividing a field of view into multiple (N, N≥2) slices (also referred to as ranges) $RNG_1$ to $RNG_N$ in a depth direction. The entire field of view, that is, the sensing of all the slices $RNG_1$ to $RNG_N$, is defined as one frame, and the sensing of one frame is referred to as one scan. In the present specification, the term "frame rate" represents the number of frames that can be imaged per unit time (1 second).

The illumination apparatus 110 emits illumination light L1 in a field of view in front of the vehicle in synchronization with a light emission timing signal (light emission instruction) S1 supplied from the camera controller 130. The illumination light L1 is preferably infrared light, but the present invention is not limited thereto, the illumination light L1 may be visible light or ultraviolet light having a predetermined wavelength.

The image sensor 120 includes multiple pixels, is capable of exposure control in synchronization with an exposure timing signal S2 supplied from the camera controller 130, and generates an image (RAW image) including multiple pixels. The image sensor 120 is sensitive to the same wavelength as that of the illumination light L1, and images reflected light (return light) L2 reflected by the object OBJ. A slice image $IMG_i$ generated by the image sensor 120 with respect to an i-th slice $RNG_i$ is referred to as an image $IMG_i$ (or a primary image) as necessary so as to be distinguished from a final output image IMGf of the gating camera 100. The output image IMGf may be a set of multiple slice images, and may be a single piece of image data obtained by synthesizing the multiple slice images.

The camera controller 130 controls the light emission of the illumination light L1 by the illumination apparatus 110, specifically, the light emission timing and the light emission time, and the exposure by the image sensor 120, specifically, the exposure timing and the exposure time. The camera controller 130 is implemented as a combination of a processor (hardware) such as a central processing unit (CPU), a micro processing unit (MPU), a microcontroller, or the like, and a software program to be executed by the processor (hardware).

The image $IMG_i$ generated by the image sensor 120 is transmitted to the arithmetic processing device 140. The arithmetic processing device 140 processes multiple slice images $IMG_1$ to $IMG_N$ acquired for the multiple slice $RNG_1$ to $RNG_N$. The arithmetic processing device 140 may be implemented in the same hardware as the camera controller 130 or may be configured by separate hardware.

The above is the basic configuration of the gating camera 100. A basic operation of the gating camera 100 is the same as in Embodiment 1, and is as described with reference to FIG. 2, FIG. 3A and FIG. 3B.

In a case in which the gating camera 100 is used as an in-vehicle sensor, a frame rate as high as possible is required. Description will be made below regarding a technique for improving the frame rate.

In order to increase the frame rate, in the present embodiment, as the slice becomes farther, the gating camera 100 increases an intensity of the illumination light. The gating camera 100 alternately repeats a forward scan for sensing from a near-distance slice toward a far-distance slice, and a reverse scan for sensing from a far-distance slice toward a near-distance slice.

Specifically, the camera controller 130 controls the light emission timing of the illumination apparatus 110 and the exposure of the image sensor 120 so as to alternately generate the forward scan and the reverse scan.

The illumination apparatus 110 is configured to have a variable light emission brightness (intensity of the illumination light) according to a brightness command S4. The camera controller 130 controls the intensity of the illumination light by changing the brightness command S4. The camera controller 130 increases a light emission intensity of the illumination apparatus 110 for each slice in the forward scan, and decreases the light emission intensity of the illumination apparatus 110 for each slice in the reverse scan.

In the present embodiment, in the forward scan, one slice group of an odd-numbered slice group and an even-numbered slice group (in this example, odd-numbered $RNG_1$, $RNG_3$, . . . ) among the multiple slice $RNG_1$ to $RNG_N$ is scanned. In the reverse scan, the other slice group of the odd-numbered slice group and the even-numbered slice group (in this example, even-numbered $RNG_2$, $RNG_4$, . . . ) among the multiple slice $RNG_1$ to $RNG_N$ is scanned.

The above is the configuration of the gating camera 100. Next, description will be made regarding the operation of the imaging camera 100.

Figure 13:
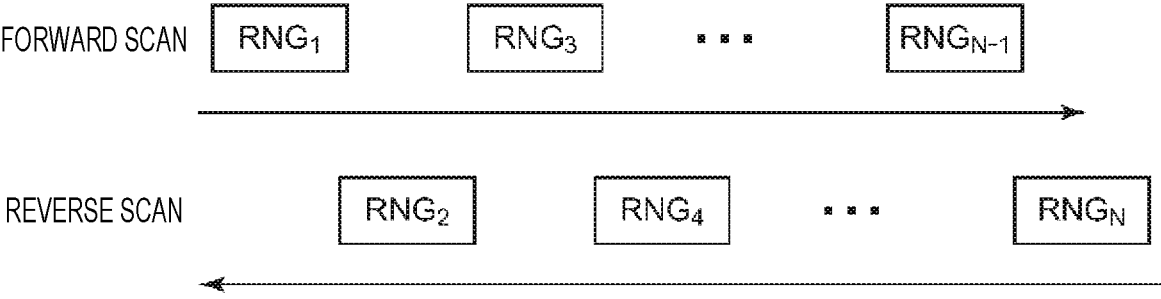
FIG. 13 illustrates a forward scan and a reverse scan by the gating camera.

FIG. 13 illustrates the forward scan and the reverse scan by the gating camera 100. Here, the number N of slices is 10.

Figure 14A:
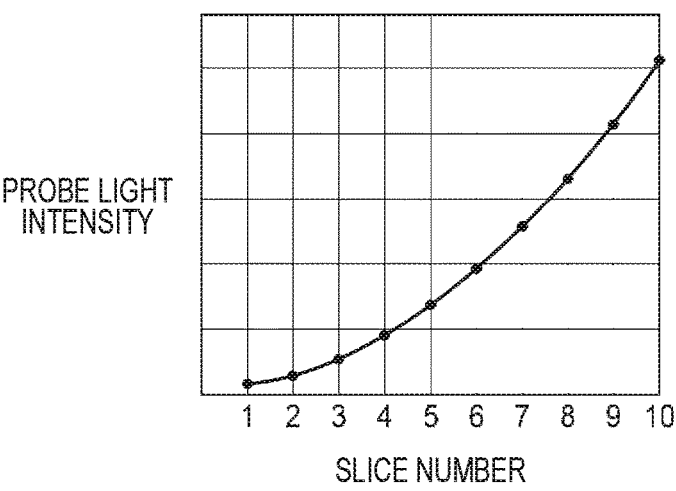
FIG. 14A and FIG. 14B illustrate control of an intensity of illumination light by the gating camera.
Figure 14B:
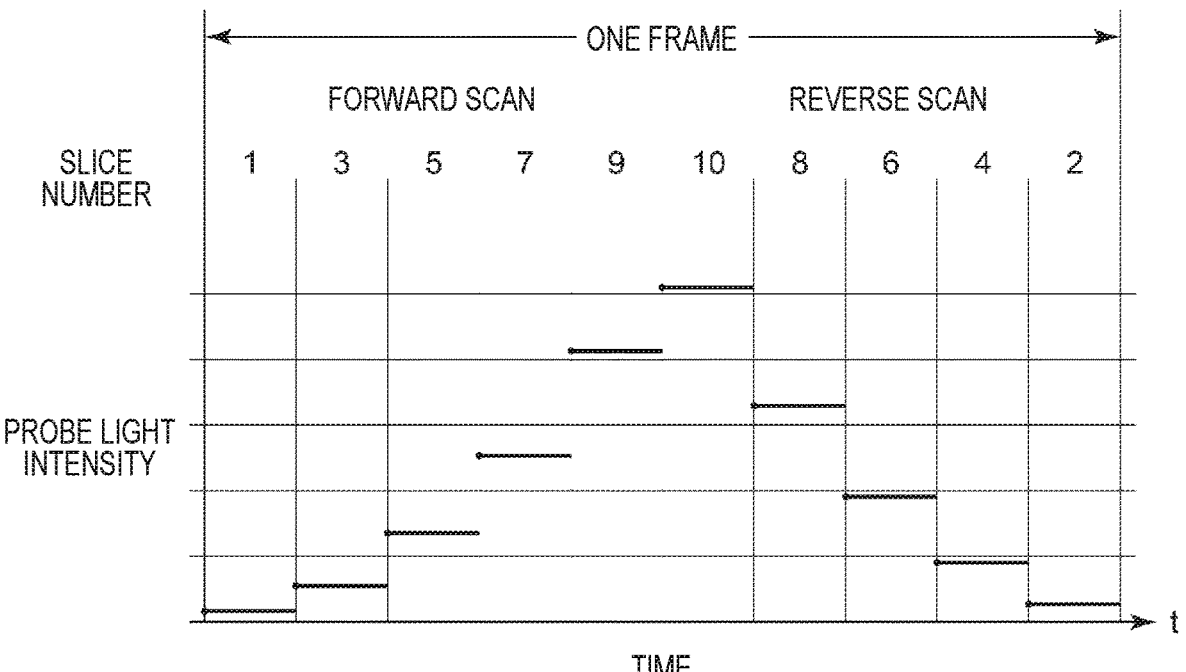

FIG. 14A and FIG. 14B illustrate control of an intensity of illumination light by the gating camera 100. FIG. 14A illustrates an intensity of optimum illumination light for each slice, and FIG. 14B is a waveform diagram illustrating the operation of the gating camera 100 in one frame. Since all the slices are imaged with a set of the forward scan and the reverse scan, the set of the forward scan and the reverse scan becomes one frame.

The above is the operation of the gating camera 100. With the gating camera 100, as the slice becomes farther, the intensity of the illumination light becomes higher. Accordingly, the number of light emissions and exposures required to generate an image of a farther slice can be reduced, thereby improving the frame rate.

Figure 15:
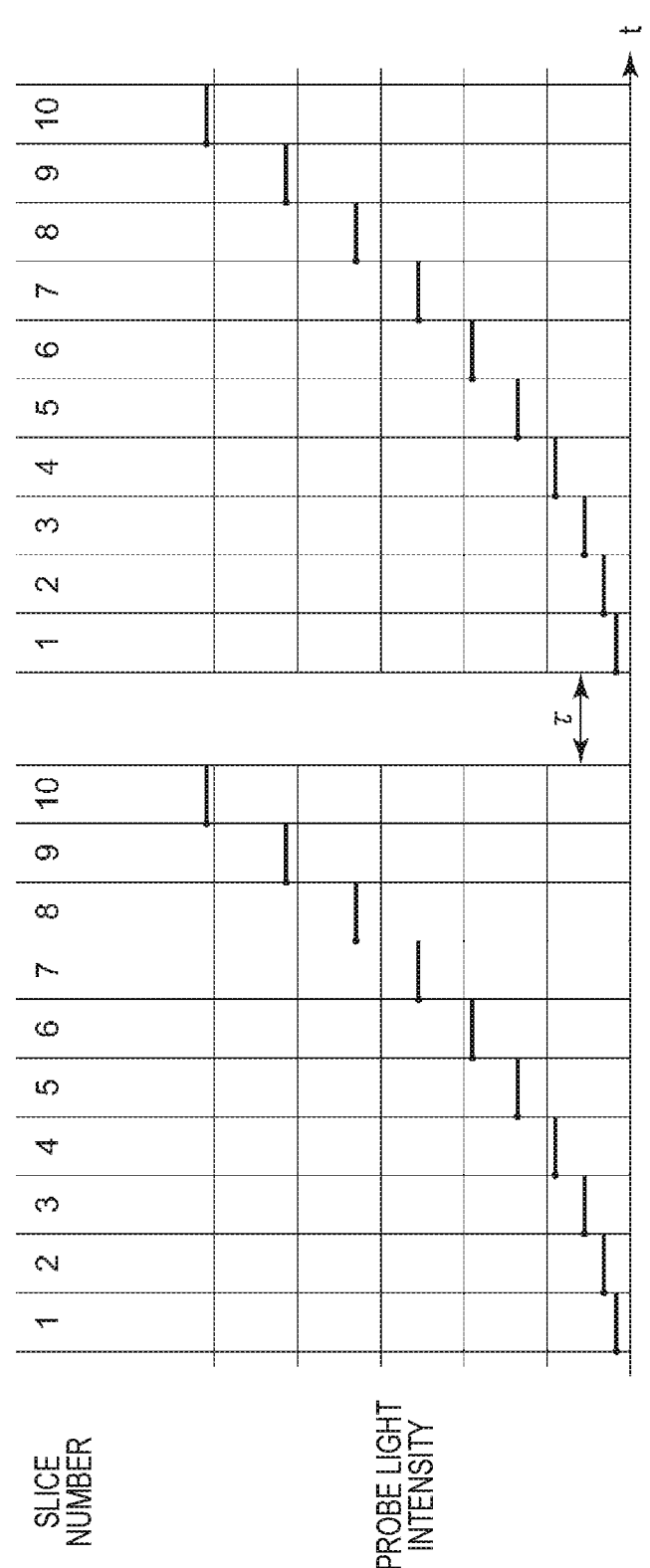
FIG. 15 illustrates operation of a gating camera according to a comparison technique.

The additional advantages of the gating camera 100 are clear in comparison with a comparison technique. FIG. 15 illustrates operation of a gating camera according to a comparison technique. In the comparison technique, the gating camera always scans multiple slices $RNG_1$ to $RNG_N$ in the same direction (for example, from the nearer side to the farther side). In this case, when the transition is made from a given frame to the next frame, that is, when the transition is made from the farthest slice $RNG_N$ to the nearest slice $RNG_1$, the intensity of the illumination light needs to be changed steeply.

In a case in which the illumination light is infrared, the illumination light is not perceived by the human eye. However, considering the influence on a sensor other than the present gating camera, a steep change in intensity is not preferable. In this regard, in the present embodiment, a steep change in intensity of the illumination light at the time of transition from one frame to the next frame is prevented, and thus an adverse effect on the other sensors is reduced.

Further, in the comparison technique, when the transition is made from a given frame to a given frame, the settling time τ until the intensity of the illumination light is stabilized becomes longer.

Figure 16:
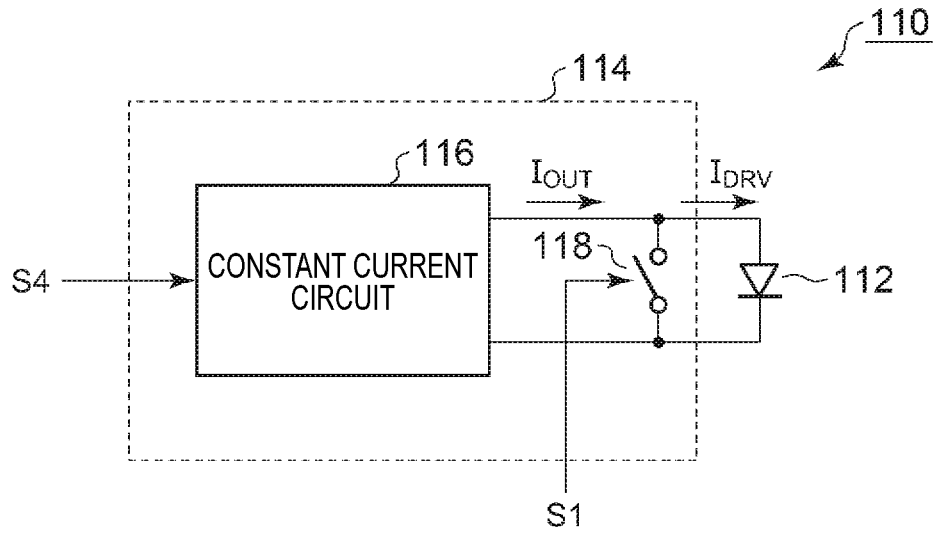
FIG. 16 is a block diagram illustrating a configuration example of an illumination apparatus.

FIG. 16 is a block diagram illustrating a configuration example of the illumination apparatus 110. The illumination apparatus 110 includes a semiconductor light source 112 such as a laser diode or a light emitting diode (LED), and a driver circuit 114 configured to supply a drive current $I_{DRV}$ that corresponds to the brightness command S4 to the semiconductor light source 112 in response to the light emission timing signal S1. For example, the driver circuit 114 includes a constant current circuit 116 configured to generate an output current $I_{OUT}$ with an amount of current that corresponds to the brightness command S4, and a bypass switch 118 provided in parallel with the semiconductor light source 112. The bypass switch 118 is in a normally-on state. The output current $I_{OUT}$ of the constant current circuit 116 flows around the bypass switch 118, so that the semiconductor light source 112 is turned off. When the bypass switch 118 is turned off in response to the light emission timing signal S1, the output current $I_{OUT}$ of the constant current circuit 116 flows to the semiconductor light source 112, and the semiconductor light source 112 emits light with a brightness that corresponds to the amount of current of the output current $I_{OUT}$, that is, the brightness command S4.

It should be noted that the configuration of the illumination apparatus 110 is not limited to that shown in FIG. 16. For example, the illumination apparatus 110 may be configured to include a mechanical shutter instead of the bypass switch 118 and open the mechanical shutter in response to the light emission timing signal S1.

The constant current circuit 116 includes a feedback loop. In order to change the output current $I_{OUT}$ from a given current level to a different current level, the settling time is required. The settling time increases as a width of change in the current level increases.

In the comparison technique, the width of change in current is large, resulting in the long settling time τ. As the settling time τ becomes longer, one frame period becomes longer. Accordingly, the frame rate decreases.

In contrast, with the present embodiment, the width of change in the intensity of the illumination light can be reduced when the transition is made from one frame to the next frame. Therefore, the settling time of the illumination apparatus 110 can be shortened, thereby preventing a decrease in the frame rate.

Figure 17:
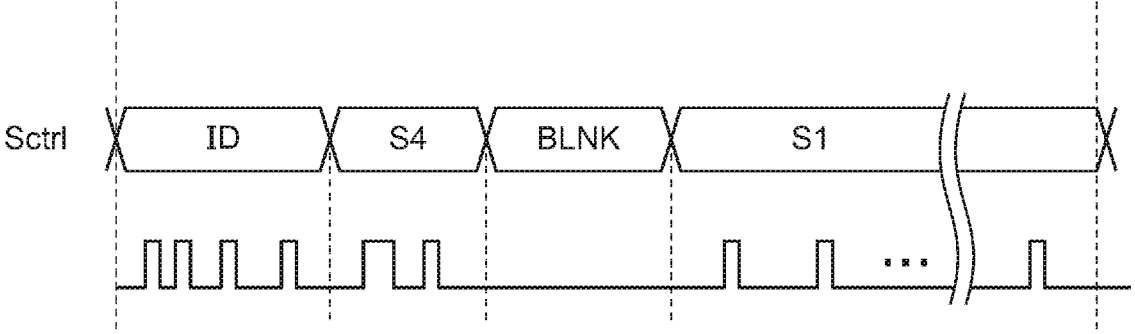
FIG. 17 illustrates a control signal including a light emission timing signal and a brightness command.

Next, description will be made regarding the control of the illumination apparatus 110 by the camera controller 130. In an embodiment, the camera controller 130 embeds the light emission timing signal (S1) and the brightness command value (S4) for the illumination apparatus 110 in the same control signal Sctrl, and transmits the control signal Sctrl to the illumination apparatus 110. FIG. 17 illustrates a control signal including the light emission timing signal S1 and the brightness command S4. FIG. 17 illustrates the control signal Sctrl for one slice. The upper part of FIG. 17 illustrates a configuration of the control signal Sctrl, and the lower part illustrates an example of a specific waveform of the control signal Sctrl.

The control signal Sctrl is a high (1)/low (0), binary signal transmitted on a one-channel control line. Also, the control signal may be a differential signal.

An identifier ID is arranged at the head of one slice of the control signal Sctrl. The identifier ID includes predetermined high and low patterns.

Following the identifier ID, the brightness command S4 is transmitted. The brightness command S4 may include binary data that directly indicates the light emission brightness. In this case, the illumination apparatus 110 is configured to emit light with a brightness that corresponds to the binary data.

The brightness command S4 may include data that indirectly indicates the light emission brightness. For example, the data may include a slice number. The illumination apparatus 110 is configured to hold a relation between the slice number and the light emission brightness, and to emit light with a light emission brightness that corresponds to the slice number.

Following the brightness command S4, a blank period BLNK may be inserted. During the blank period BLNK, the constant current circuit 116 of the illumination apparatus 110 changes the output current $I_{OUT}$. During the blank period BLNK, the control signal Sctrl may be fixed to a constant level (for example, low), and may include a predetermined pattern.

Following the blank period BLNK, the light emission timing signal S1 is generated. The light emission timing signal S1 includes at least one pulse that represents a timing and a period during which the illumination apparatus 110 should emit light. In this example, a pulse (high) section represents a light emission period. Accordingly, during a period in which the control signal Sctrl is high, the drive current is supplied to the semiconductor light source. As described above, in a case in which multiple exposures are required for one slice sensing, the light emission timing signal S1 for one slice includes multiple pulses.

As described above, the light emission timing signal S1 and the brightness command S4 are embedded in a single control signal Sctrl, thereby allowing the number of control lines to be reduced.

It should be noted that the light emission timing signal S1 and the brightness command S4 may be transmitted through separate channels (control lines).

Description will be made regarding modifications relating to Embodiment 2.

(Modification 2.1)

Figure 18:
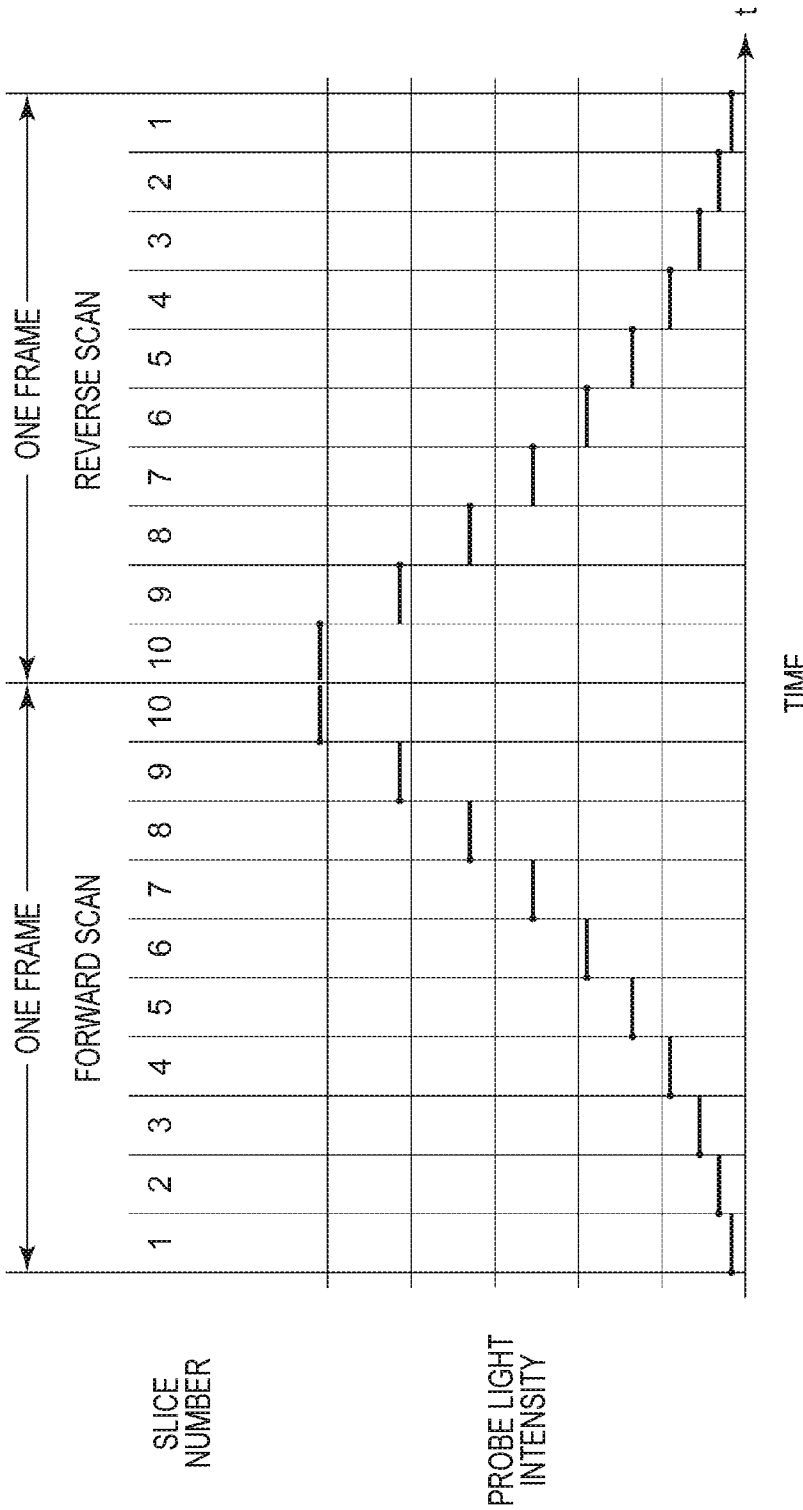
FIG. 18 is an operation waveform diagram of a gating camera according to Modification 2.1.

FIG. 18 is an operation waveform diagram of the gating camera 100 according to Modification 2.1. In Modification 2.1, all the slices $RNG_1$ to $RNG_N$ are sensed in each of the forward scan and the reverse scan. That is to say, the forward scan and the reverse scan become different frames.

With Modification 2.1, the same effect as that of the control shown in FIG. 14B can be obtained. It should be noted that, the control shown in FIG. 18 and the control shown in FIG. 14B have the same frame period, but have different advantages.

Under the control shown in FIG. 18, in a case in which an object exists in the farthest slice, in order to detect the object, the sensing of all the slices has to be waited for. In contrast, under the control shown in FIG. 14B, it is possible to judge roughly the presence or absence of an object from the near side to the far side of the field of view with a time period of half the frame period.

Description will be made assuming that the distance to an object is calculated based on the principle of the indirect TOF method based on two slice images acquired for two adjacent slices. In this case, under the control shown in FIG. 14B, time slots for sensing the two slices are separated. Accordingly, when an object moves between the time slots, distance measurement precision may decrease. In contrast, under the control shown in FIG. 18, the two slices are sensed in adjacent time slots, leading to improved measurement precision.

It should be noted that, under the control shown in FIG. 17, the same slice is measured consecutively in two adjacent frames. However, single measurement may be omitted.

(Modification 2.2)

In Modification 2.2, the image sensor 120 is a multi-tap image sensor having multiple floating diffusion (charge accumulation region) FDs for each pixel, and can individually control the exposure timing for each pixel.

Figure 19:
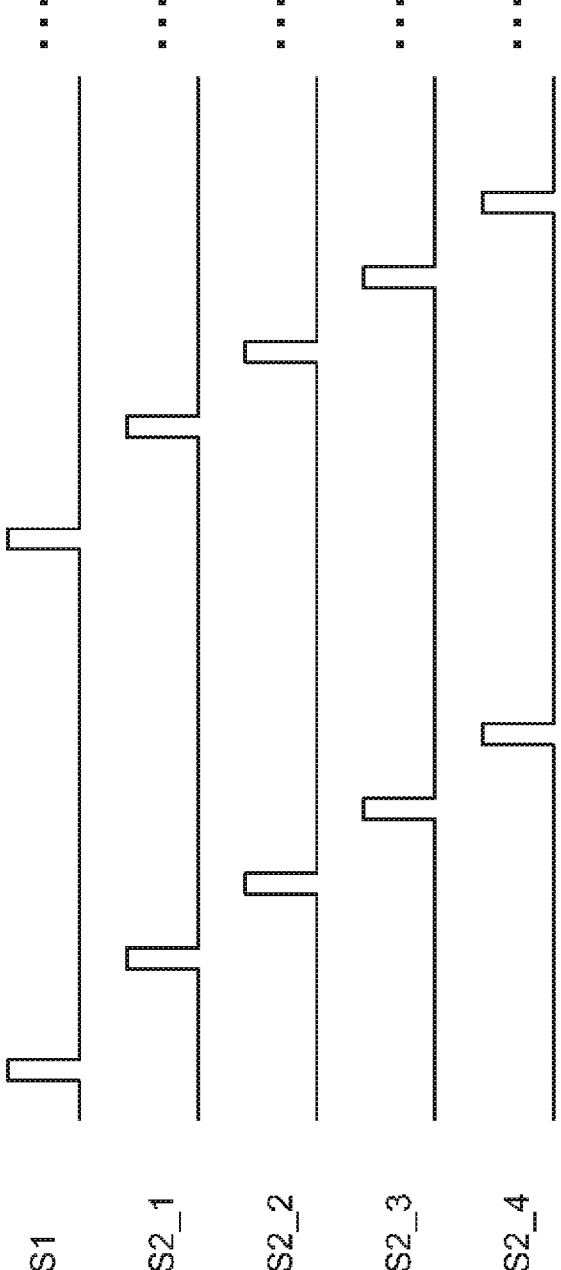
FIG. 19 illustrates operation of a gating camera when a multi-tap image sensor is used.

FIG. 19 illustrates operation of the gating camera 100 when a multi-tap image sensor is used. Description will be made below regarding an example of a 4-tap image sensor having four floating diffusions. FIG. 19 illustrates the operation of one subframe. A waveform S1 shows the light emission timing of the illumination apparatus 110, and waveforms S2_1 to S2_4 show the exposure timings of four taps TAP1 to TAP4.

In one subframe, multiple (four in this case) adjacent slices can be sensed at the same time by capturing exposure results at different timings in the multiple floating diffusions. It should be noted that as shown in FIG. 19, a single subframe may include multiple sets of light emission and exposure.

Figure 20:
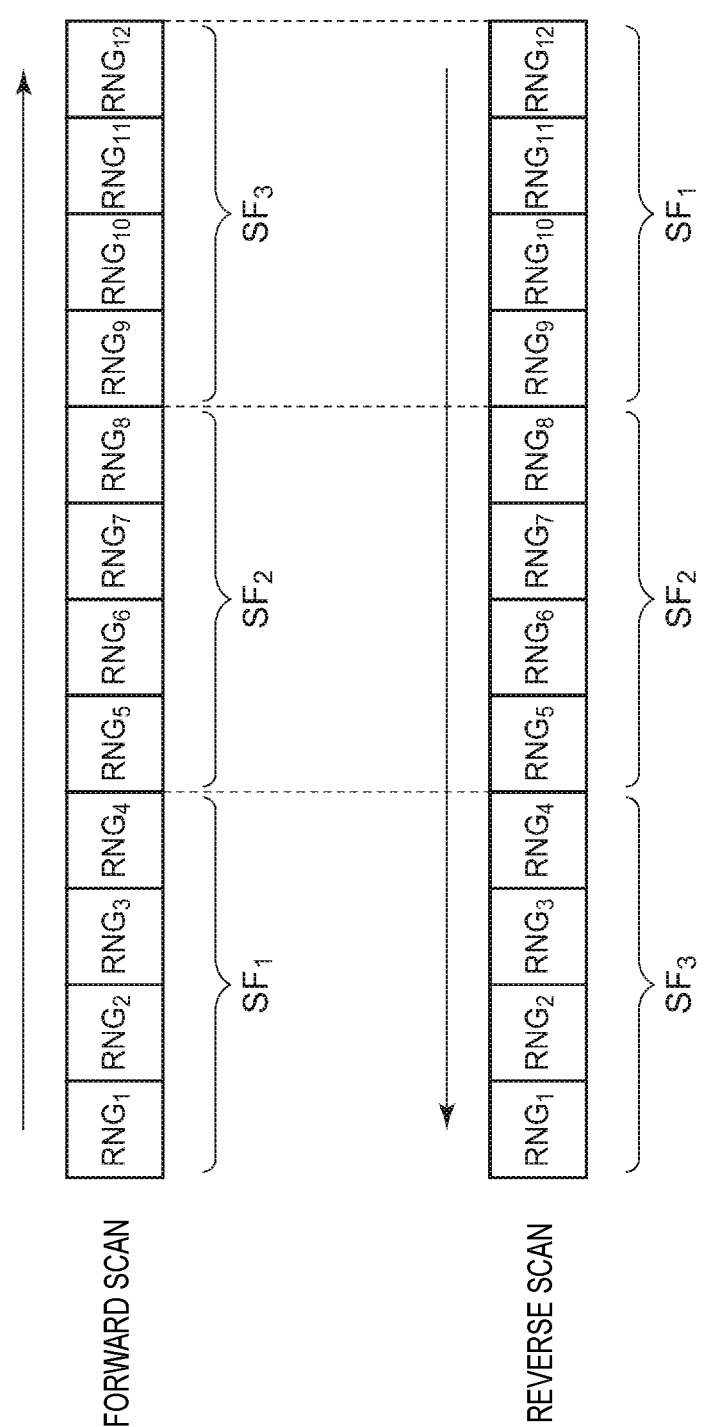
FIG. 20 illustrates a forward scan and a reverse scan by a gating camera according to Modification 2.2.

FIG. 20 illustrates the forward scan and the reverse scan by the gating camera 100 according to Modification 2.2. Here, the number N of slices is 12. In the forward scan, in a first sub-scan SF 1, the farthest four slices $RNG_1$ to $RNG_4$ are measured. In a second sub-scan $SF_2$, the four slices $RNG_5$ to $RNG_8$ are measured. In a third sub-scan $SF_3$, the nearest four slices $RNG_9$ to $RNG_{12}$ are measured.

In the reverse scan, in the first sub-scan $SF_1$, the farthest four slices $RNG_9$ to $RNG_{12}$ are measured. In the second sub-scan $SF_2$, the four slices $RNG_5$ to $RNG_8$ are measured. In the third sub-scan $SF_3$, the nearest four slices $RNG_1$ to $RNG_4$ are measured.

Figure 21:
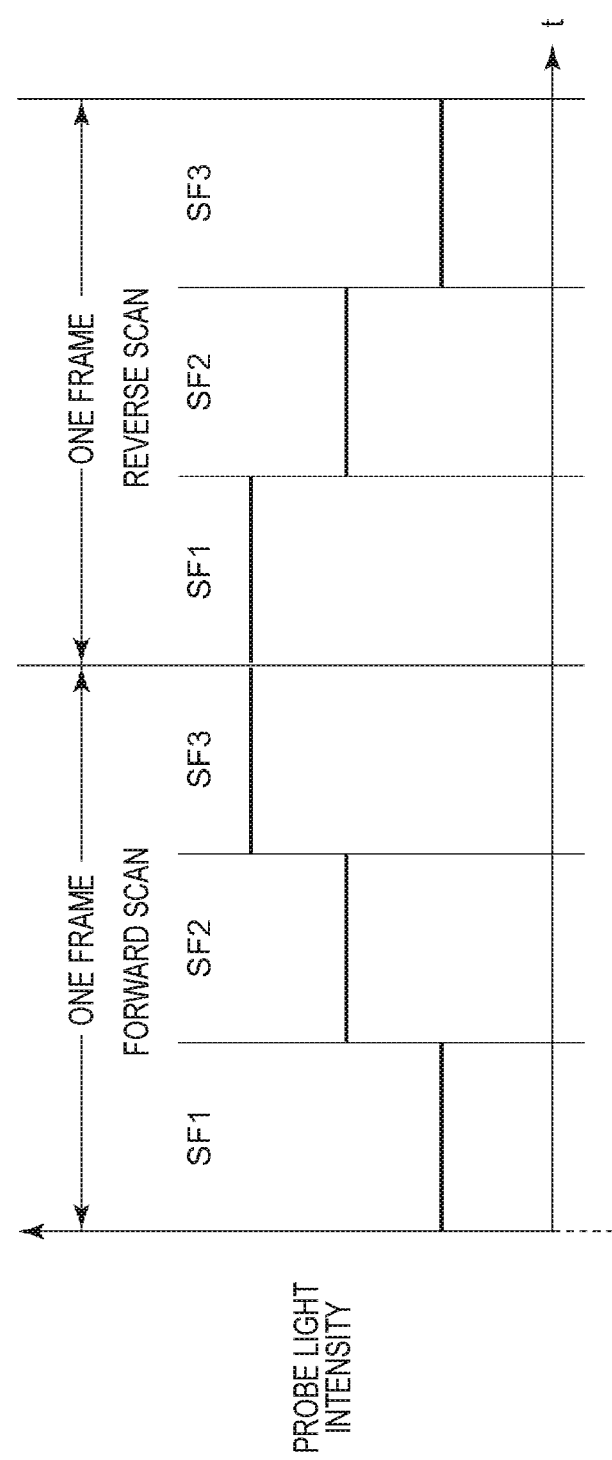
FIG. 21 illustrates transition of an intensity of illumination light according to Modification 2.2.

FIG. 21 illustrates transition of an intensity of illumination light according to Modification 2.2. The intensity of the illumination light is switched on a subframe-by-subframe basis. In the forward scan, the intensity of the illumination light increases in the order of $SF_1$, $SF_2$, and $SF_3$. In reverse scanning, the intensity of the illumination light decreases in the order of $SF_1$, $SF_2$, and $SF_3$. With Modification 2.2, the frame rate can be improved.

Embodiment 3

Figure 22:
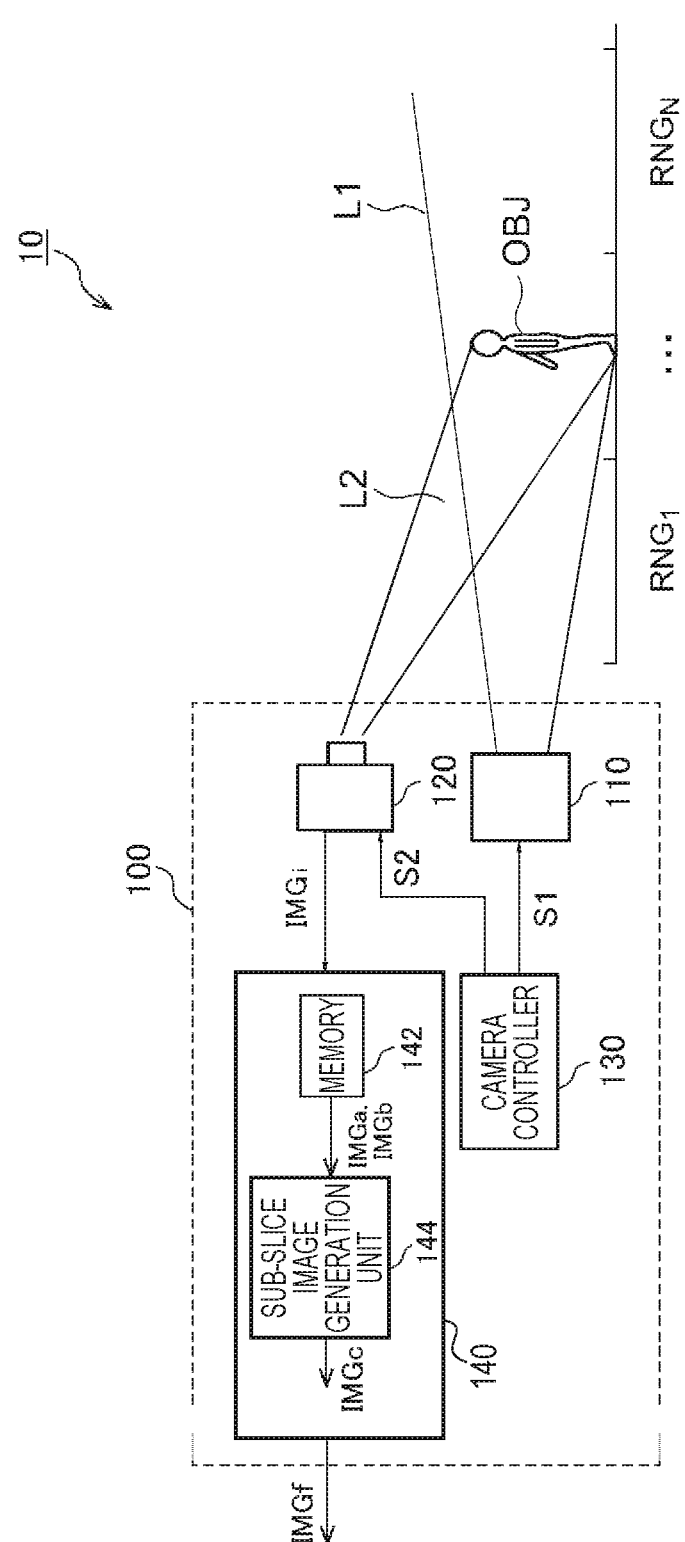
FIG. 22 is a block diagram of a sensing system according to Embodiment 3.

FIG. 22 is a block diagram of a sensing system 10 according to Embodiment 3.

The sensing system 10 is mounted on a vehicle such as an automobile, a motorcycle, or the like, and detects an object OBJ existing around the vehicle.

The sensing system 10 mainly includes a gating camera 100.

The gating camera 100 includes an illumination apparatus 110, an image sensor 120, a camera controller 130, and an arithmetic processing device 140.

The imaging by the gating camera 100 is performed by dividing a field of view into multiple (N, N≥2) slices (also referred to as ranges) $RNG_1$ to $RNG_N$ in a depth direction. The entire field of view, that is, the sensing of all the slices $RNG_1$ to $RNG_N$, is defined as one frame, and the sensing of one frame is referred to as one scan.

In the present specification, the term "frame rate" represents the number of frames that can be imaged per unit time (1 second).

The illumination apparatus 110 emits illumination light L1 in a field of view in front of the vehicle in synchronization with a light emission timing signal S1 supplied from the camera controller 130. The illumination light L1 is preferably infrared light, but the present invention is not limited thereto, the illumination light L1 may be visible light or ultraviolet light having a predetermined wavelength.

The image sensor 120 includes multiple pixels, is capable of exposure control in synchronization with an exposure timing signal S2 supplied from the camera controller 130, and generates an image (RAW image) including multiple pixels. The image sensor 120 is sensitive to the same wavelength as that of the illumination light L1, and images reflected light (return light) L2 reflected by the object OBJ. A slice image IMGi generated by the image sensor 120 with respect to an i-th slice $RNG_i$ is referred to as an image IMGi (or a primary image) as necessary so as to be distinguished from a final output image IMGf of the gating camera 100. The output image IMGf may be a set of multiple slice images, and may be a single piece of image data obtained by synthesizing the multiple slice images.

The output image IMGf may include a sub-slice image to be described later.

The camera controller 130 controls the light emission of the illumination light L1 by the illumination apparatus 110, specifically, the light emission timing and the light emission time, and the exposure by the image sensor 120, specifically, the exposure timing and the exposure time. The camera controller 130 is implemented as a combination of a processor (hardware) such as a central processing unit (CPU), a micro processing unit (MPU), a microcontroller, or the like, and a software program to be executed by the processor (hardware).

The image $IMG_i$ generated by the image sensor 120 is transmitted to the arithmetic processing device 140. The arithmetic processing device 140 processes multiple slice images $IMG_1$ to $IMG_N$ acquired for the multiple slice $RNG_1$ to $RNG_N$. The arithmetic processing device 140 may be implemented in the same hardware as the camera controller 130 or may be configured by separate hardware.

The above is the basic configuration of the gating camera 100. A basic operation of the gating camera 100 is the same as in Embodiment 1, and is as described with reference to FIGS. X and Y.

In a case in which the gating camera 100 is used as an in-vehicle sensor, a frame rate as high as possible is required. Description will be made below regarding a technique for improving the frame rate.

In order to increase the frame rate, in the present embodiment, the gating camera 100 executes sensing with two scans as a set.

Figure 23:
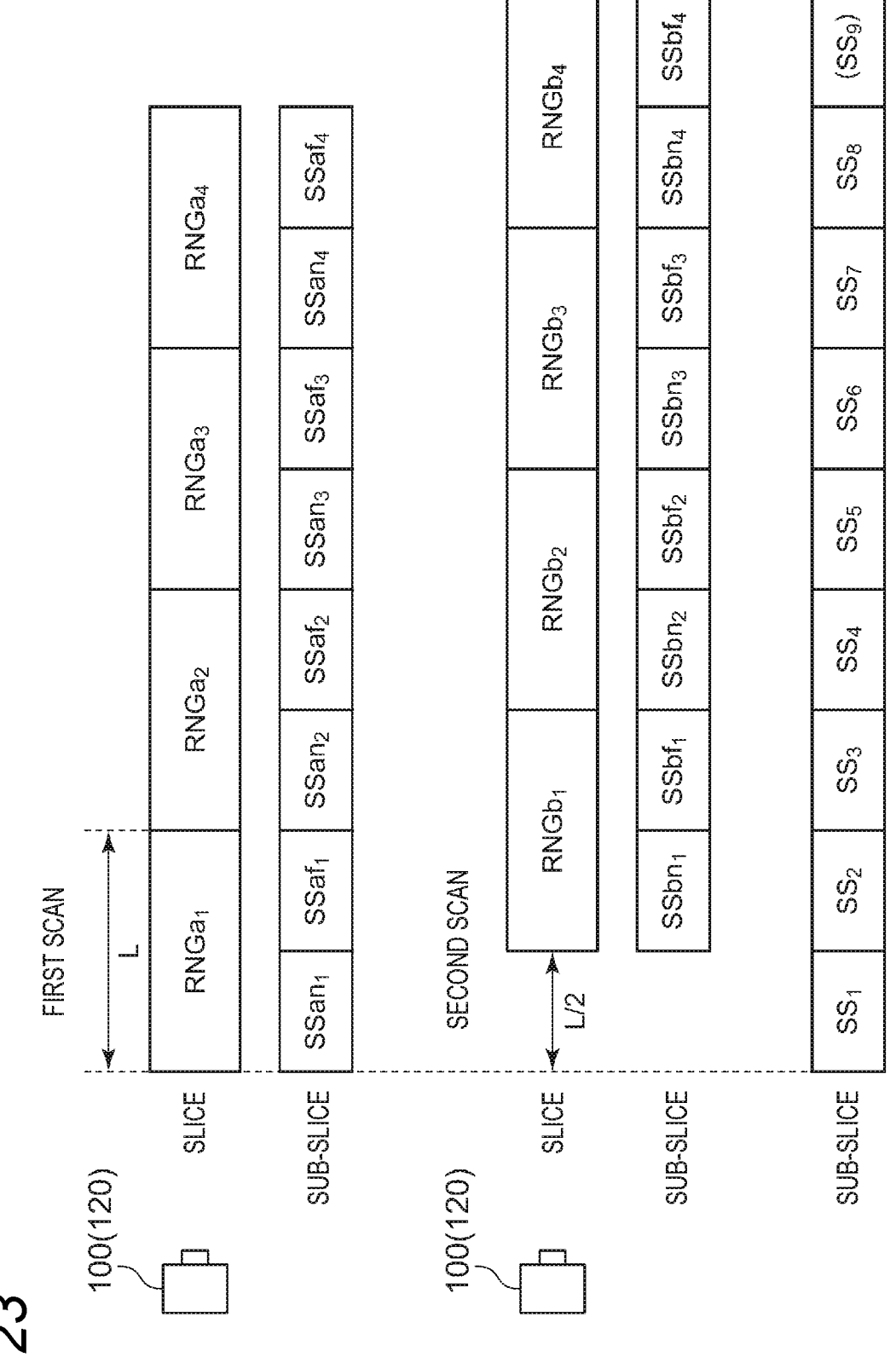
FIG. 23 illustrates slices in two temporally consecutive scans.

FIG. 23 illustrates slices in two temporally consecutive scans. In this example, the number N of slices per scan is 4. The camera controller 130 is capable of switching between the first scan and the second scan. The camera controller 130 controls the light emission of the illumination apparatus 110 and the exposure of the image sensor 120 such that boundaries of multiple slices $RNGb_1$ to $RNGb_N$ in the second scan are shifted by ½ slice (L/2) in the depth direction with respect to boundaries $RNGa_1$ to $RNGa_N$ of multiple slices in the first scan.

The first scan and the second scan are preferably executed consecutively in time. However, the present invention is not limited to such an arrangement. Also, the temporal order of the first scan and the second scan may be reversed.

By the first scan, N slice images (referred to as a first slice image group) IMGa[1] to IMGa[N] are acquired, and by the second scan, N slice images (referred to as a second slice image group) IMGb[1] to IMGb[N] are acquired. The number of slices in the second scan may be smaller by one than the number of slices in the first scan. In this case, the number of the second slice images is smaller by one than the number of the first slice images.

A range obtained by dividing a slice into two in the depth direction is referred to as a sub-slice SS. A depth of the sub-slice is L/2. A near-side sub-slice of a slice $RNGa_i$ (i=1 to N) is referred to as $SSan_i$ and a far-side sub-slice thereof is referred to as $SSaf_i$. Similarly, a near-side sub-slice of a slice $RNGb_i$ (i=1 to N) is referred to as $SSbn_i$, and a far-side sub-slice thereof is referred to as $SSbf_i$.

The sub-slices SS are denoted by serial numbers in this order from the point of view that is closest to the gating camera 100, and are denoted by $SS_1$, $SS_2$, and the like. In this example, $N\times2+1$ sub-slices $SS_1$ to $SS_9$ exist. Also, an image of a j-th sub-slice $SS_j$ is represented as a sub-slice image IMGc[j].

The sub-slices $SSan_i$ and $SSbf_{i-1}$ correspond to the sub-slice $SS_{2\times i-1}$. Also, the sub-slices $SSaf_i$ and $SSbn_i$ correspond to the sub-slice $SS_{2\times1}$.

The arithmetic processing device 140 processes the first slice image group IMGa[1] to IMGa[N] and the second slice image group IMGb[1] to IMGb[N] so as to generate an image (sub-slice image) IMGc of at least one sub-slice SS. In the present embodiment, the arithmetic processing device 140 generates images IMGc[1] to IMGc[8] of sub-slices $SS_1$ to $SS_8$.

The arithmetic processing device 140 includes a memory 142 and a sub-slice image generation unit 144. The memory 142 holds the first slice image group IMGa[1] to IMGa[N] and the second slice image group IMGb[1] to IMGb[N] output from the image sensor 120.

The sub-slice image generation unit 144 reads out the first slice image group IMGa[1] to IMGa[N] and the second slice image group IMGb[1] to IMGb[N] from the memory 142, and generates an image of a sub-slice. It should be noted that, in a case in which the arithmetic processing device 140 is implemented as a combination of a software program and a processor, a substance of the sub-slice image generation unit 144 is a processor.

Description will be made regarding processing of the sub-slice image generation unit 144. The sub-slice $SSaf_i$ and the sub-slice $SSbn_i$ indicate the same range. However, for convenience of description, description will be made assuming that the image IMGaf[i] of the sub-slice $SSaf_i$ and the image IMGbn[i] of the sub-slice $SSbn_i$ are distinguished. Similarly, the image IMGan[i] of the sub-slice $SSan_i$ is distinguished from an image IMGbf[i−1] of a sub-slice $SSbf_{[i-1]}$.

Figure 24:
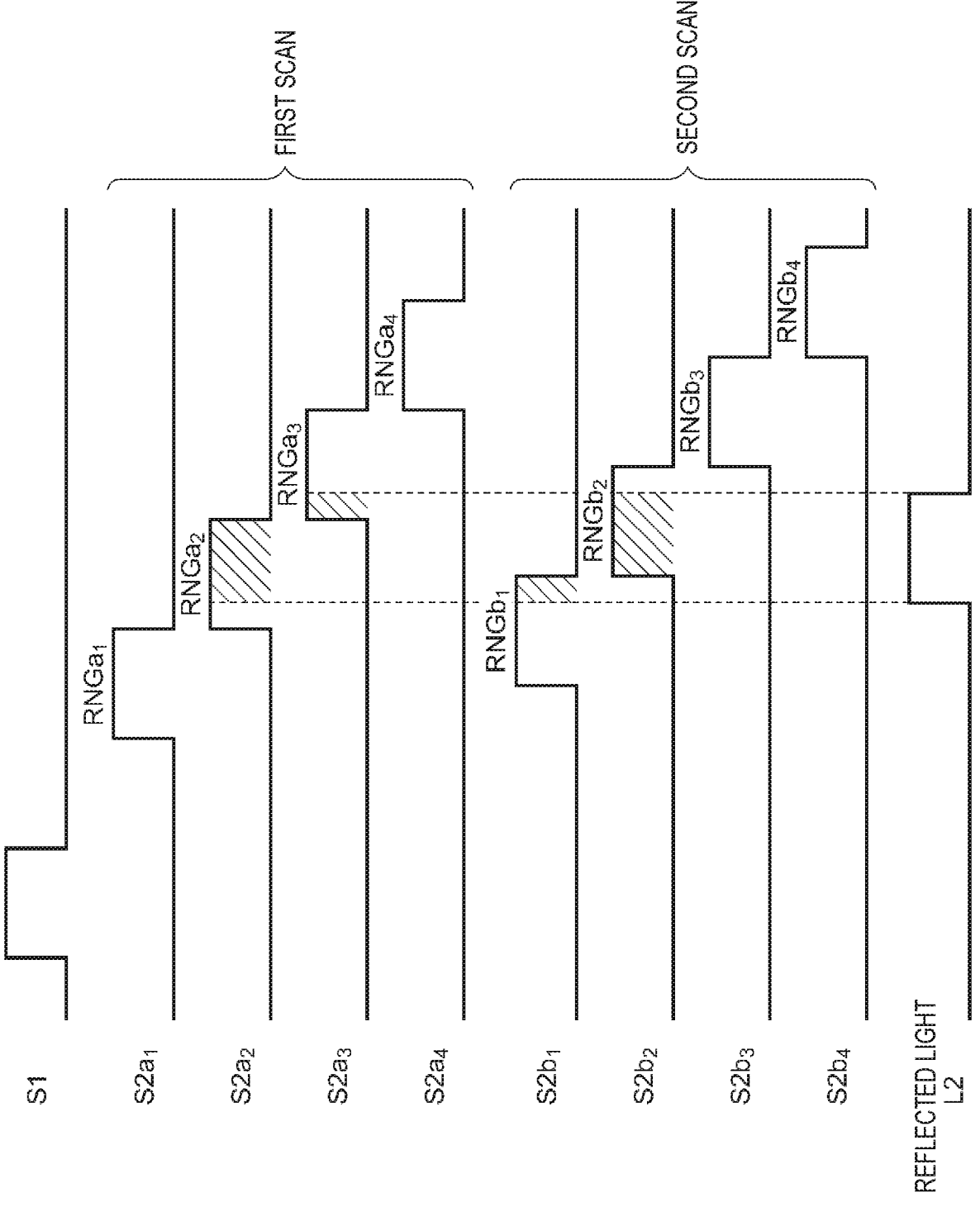
FIG. 24 is a time chart illustrating an example of operation of a gating camera.

Description will be made assuming that the light emission time of the illumination apparatus 110 is equal to the exposure time of the image sensor 120. FIG. 24 is a time chart illustrating an example of operation of the gating camera 100.

S1 represents the light emission timing of the illumination apparatus 110. $S2a_1$ to $S2a_4$ illustrate a relative time difference between the exposure timing and the light emission timing when the slices $RNGa_1$ to $RNGa_4$ are imaged in the first scan. $S2b_1$ to $S2b_4$ illustrate a relative time difference between the exposure timing and the light emission timing when the slices $RNGb_1$ to $RNGb_4$ are imaged in the second scan.

The lowermost part of FIG. 24 illustrates a waveform of reflected light L2 that is incident on the image sensor 120 after the illumination light is reflected by the object.

The reflected light L2 is detected by the exposure of the second and third slices in the first scan, and is detected by the exposure of the first and second slices in the second scan. A hatched portion represents the amount of light detected in each exposure.

The image of the sub-slice $SSan_i$ can be generated using the following equation.

$$IMGan[i]=\{IMGa[i]+IMGa[i+1]\}-\{IMGb[i]+IMGb[i+1]\}$$

The addition and subtraction are operations of adding and subtracting the corresponding pixel values. It should be noted that, when the pixel value becomes negative as a result of the subtraction, the pixel value may be set to 0.

The image of the sub-slice $SSbn_i$ can be generated using the following equation.

$$IMGbn[i]=\{IMGb[i]+IMGb[i+1]\}-\{IMGa[i+1]+IMGa[i+2]\}$$

The image of the sub-slice $SSaf_i$ can be generated using the following equation.

$$IMGaf[i]=\{IMGa[i]+IMGa[i-1]\}-\{IMGb[i-1]+IMGb[i-2]\}$$

The image of the sub-slice $SSbf_i$ can be generated using the following equation.

$$IMGbf[i]=\{IMGb[i]+IMGb[i-1]\}-\{IMGa[i]+IMGa[i-1]\}$$

The arithmetic processing device 140 may output IMGan[i], IMGbn[i], IMGaf[i], and IMGbf[i] as they are.

The two sub-slice images IMGaf[i] and IMGbn[i] are images that indicate the same sub-slice $SS_{2\times i}$, but are sensed at different timings. Accordingly, the two sub-slice images IMGaf[i] and IMGbn[i] are affected by noise and the like and are not the same. Therefore, the arithmetic processing device 140 may generate the image IMGc[j] of the sub-slice $SS_{2\times i}$ using the two sub-slice images IMGaf[i] and IMGbn[i].

For example, an image IMGc[2×i] of the sub-slice $SS_{2\times i}$ may be set as an average of the two sub-slice images IMGaf[i] and IMGbn[i]. $IMGc[_{2\times i}]=(IMGaf[i]+IMGbn[i])/2$ The image IMGc[2×i] of the sub-slice $SS_{2\times i}$ may be set as an addition value of the two sub-slice images IMGaf[i] and IMGbn[i].

$$IMGc[2\times i]=IMGaf[i]+IMGbn[i]$$

Alternatively, one of the sub-slice images IMGaf[i] and IMGbn[i] may be set as the image IMGc[2×i] of the sub-slice $SS_{2\times i}$.

Similarly, the image IMGc[2×i−1] of the sub-slice $SS_{2\times i-1}$ may be set as an average of the two sub-slice images IMGan[i] and IMGbf[i−1].

$$IMGc[2\times i-1]=(IMGan[i]+IMGbf[i-1])/2$$

The image IMGc[2×i−1] of the sub-slice $SS_{2\times i-1}$ may be set as an addition value of the two sub-slice images IMGan[i] and IMGbf[i−1].

$$IMGc[2\times i-1]=IMGan[i]+IMGbf[i-1]$$

Also, one of the sub-slice images IMGan[i] and IMGbf[i−1] may be set as the image IMGc[2×i−1] of the sub-slice $SS_{2\times i-1}$.

With the gating camera 100, N slices are scanned by the first scan and the second scan, respectively, and thus images of (2×N) sub-slices can be generated.

Figure 25:
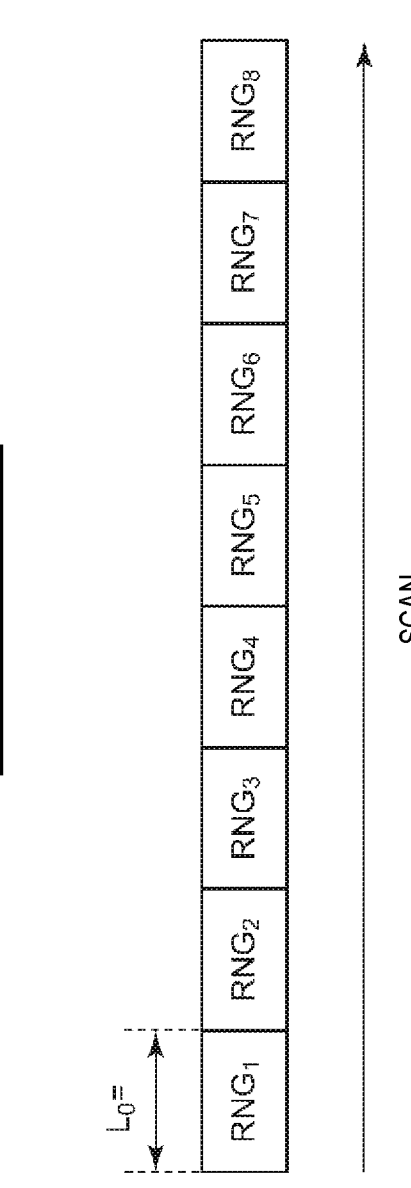
FIG. 25 illustrates operation of a gating camera according to a comparison technique.
Figure 25:
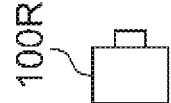

The advantages of the gating camera 100 are clear in comparison with a comparison technique. FIG. 25 illustrates operation of a gating camera according to a comparison technique. In the comparison technique, the entire field of view is divided into (2×N) slices. That is to say, a depth $L_0$ of the slice in the comparison technique is equal to the depth of the sub-slice in the embodiment, which is ½ the depth L of the slice in the embodiment. In the comparison technique, all of 2×N slices are sequentially sensed in one scan.

In the comparison technique, assuming that the sensing time of one slice is $X_0$, the measurement time of all the slices (2×N) is represented by $X_0\times(2\times N)$. On the other hand, in the embodiment, assuming that the sensing time of one slice is $X_1$, the time required for the first scan and the second scan is $(X_1\times N)\times2$.

As described above with reference to FIG. X, as the depth $L=(d_{MAXi}-d_{MINi})$ of the slice becomes larger, the exposure time $\tau_3$ becomes longer, thereby allowing the light emission time $\tau_1$ to be increased. As a result, the amount of received light of the image sensor 120 increases. In the comparison technique, assuming that the number of exposures per slice is Y, in the embodiment, in order to obtain an image with the same brightness, the number of exposures can be less than Y. That is to say, with the embodiment, the sensing time of one slice can be reduced compared with the comparison technique, so that $X_1 < X_0$ is satisfied. Therefore, with the embodiment, the frame period can be reduced while maintaining resolution in the depth direction, thereby allowing the frame rate to be increased as compared with the comparison technique.

Description will be made regarding modifications relating to Embodiment 3.

(Modification 3.1)

The light emission time of the illumination light may be ½ or less of the exposure time of the image sensor. In this case, the arithmetic processing device 140 may generate an image IMGc of a sub-slice based on a single slice image generated in the first scan and a single slice image generated in the second scan.

The image of the sub-slice $SSan_i$ can be generated using the following equation.

$$IMGan[i]=IMGa[i]-IMGb[i]$$

The image of the sub-slice $SSbn_i$ may be generated using the following equation.

$$IMGbn[i]=IMGb[i]-IMGa[i+1]$$

The image of the sub-slice $SSaf_i$ may be generated using the following equation.

$$IMGaf[i]=IMGa[i]-IMGb[i-1]$$

The image of the sub-slice $SSbf_i$ may be generated using the following equation.

$$IMGbf[i]=IMGb[i]-IMGa[i]$$

The image IMGc[2×i] of the sub-slice $SS_{2\times i}$ may be set as an average of the two sub-slice images IMGaf[i] and IMGbn [i], and may be set as an addition value of the two sub-slice images IMGaf[i] and IMGbn[i]. Alternatively, one of the sub-slice images IMGaf[i] and IMGbn[i] may be set as the image IMGc[2×i] of the sub-slice $SS_{2\times i}$.

The image IMGc[2×i−1] of the sub-slice $SS_{2\times i-1}$ may be set as an average or an addition value of the two sub-slice images IMGan[i] and IMGbf[i−1]. Alternatively, one of the sub-slice images IMGan[i] and IMGbf[i−1] may be set as the image IMGc[2×i−1] of the sub-slice $SS_{2\times i-1}$.

(Modification 3.2)

The light emission time of the illumination light may be longer than the exposure time of the image sensor. In this case, the arithmetic processing device 140 may generate an image IMGc of a sub-slice based on three slice images generated in the first scan and three slice images generated in the second scan.

The image of the sub-slice $SSan_i$ may be generated using the following equation.

$$IMGan[i]=\{IMGa[i]+IMGa[i+1]+IMGa[i+2]\}-\\\{IMGb[i]+IMGb[i+1]+IMGb[i+2]\}$$

The addition and subtraction are operations of adding and subtracting the corresponding pixel values. It should be noted that, when the pixel value becomes negative as a result of the subtraction, the pixel value may be set to 0.

The image of the sub-slice $SSbn_i$ may be generated using the following equation.

$$IMGbn[i]=\{IMGb[i]+IMGb[i+1]+IMGb[i+2]\}-\\\{IMGa[i+1]+IMGa[i+2]+IMGa[i+3]\}$$

The image of the sub-slice $SSaf_i$ may be generated using the following equation.

$$IMGaf[i]=\{IMGa[i]+IMGa[i-1]+IMGa[i-2]\}-\{IMGb\\[i-1]+IMGb[i-2]+IMGb[i-3]\}$$

The image of the sub-slice $SSbf_i$ may be generated using the following equation.

$$IMGbf[i]=\{IMGb[i]+IMGb[i-1]+IMGb[i-2]\}-\\\{IMGa[i]+IMGa[i-1]+IMGa[i-2]\}$$

(Modification 3.3)

The image sensor 120 is a multi-tap image sensor having multiple floating diffusion (charge accumulation region) FDs for each pixel, and can individually control the exposure timing for each pixel.

Figure 26:
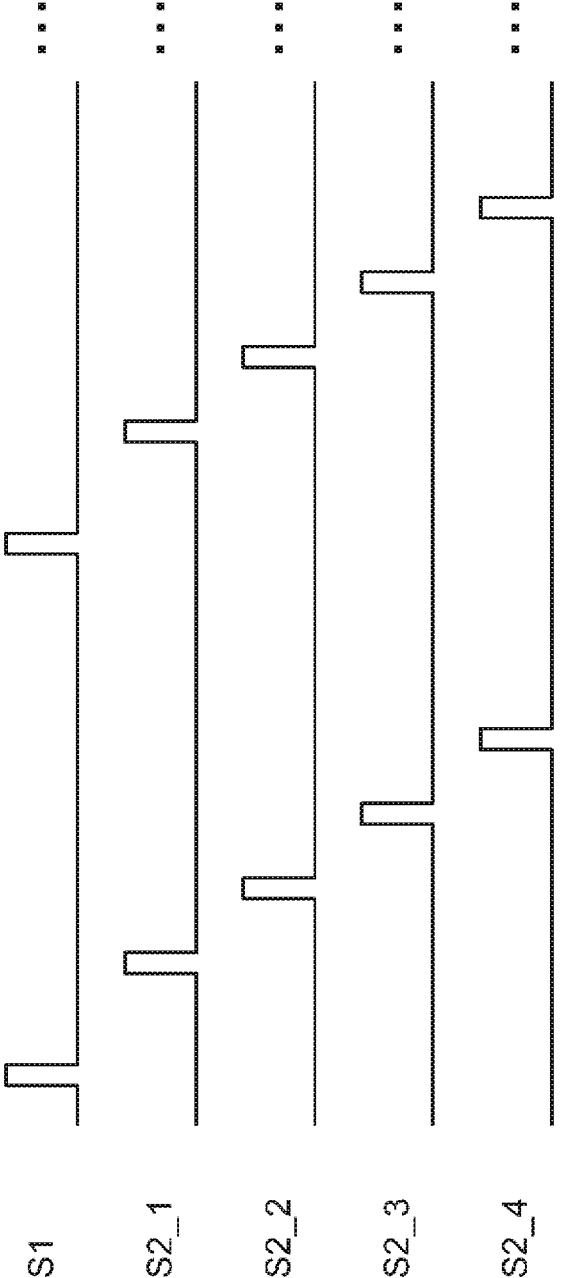
FIG. 26 illustrates operation of a gating camera when a multi-tap image sensor is used.

FIG. 26 illustrates operation of the gating camera 100 when a multi-tap image sensor is used. Description will be made below regarding an example of a 4-tap image sensor having four floating diffusions. FIG. 26 illustrates single sensing operation. A waveform S1 shows the light emission timing of the illumination apparatus 110, and waveforms S2_1 to S2_4 show the exposure timings of four taps TAP1 to TAP4.

In this case, the gating camera 100 is capable of sensing multiple consecutive slices at the same time by capturing exposure results at different timings in the multiple floating diffusions in a single sensing (referred to as a subframe). It should be noted that a single subframe may include multiple sets of light emission and exposure.

(Modification 3.4)

Figure 27:
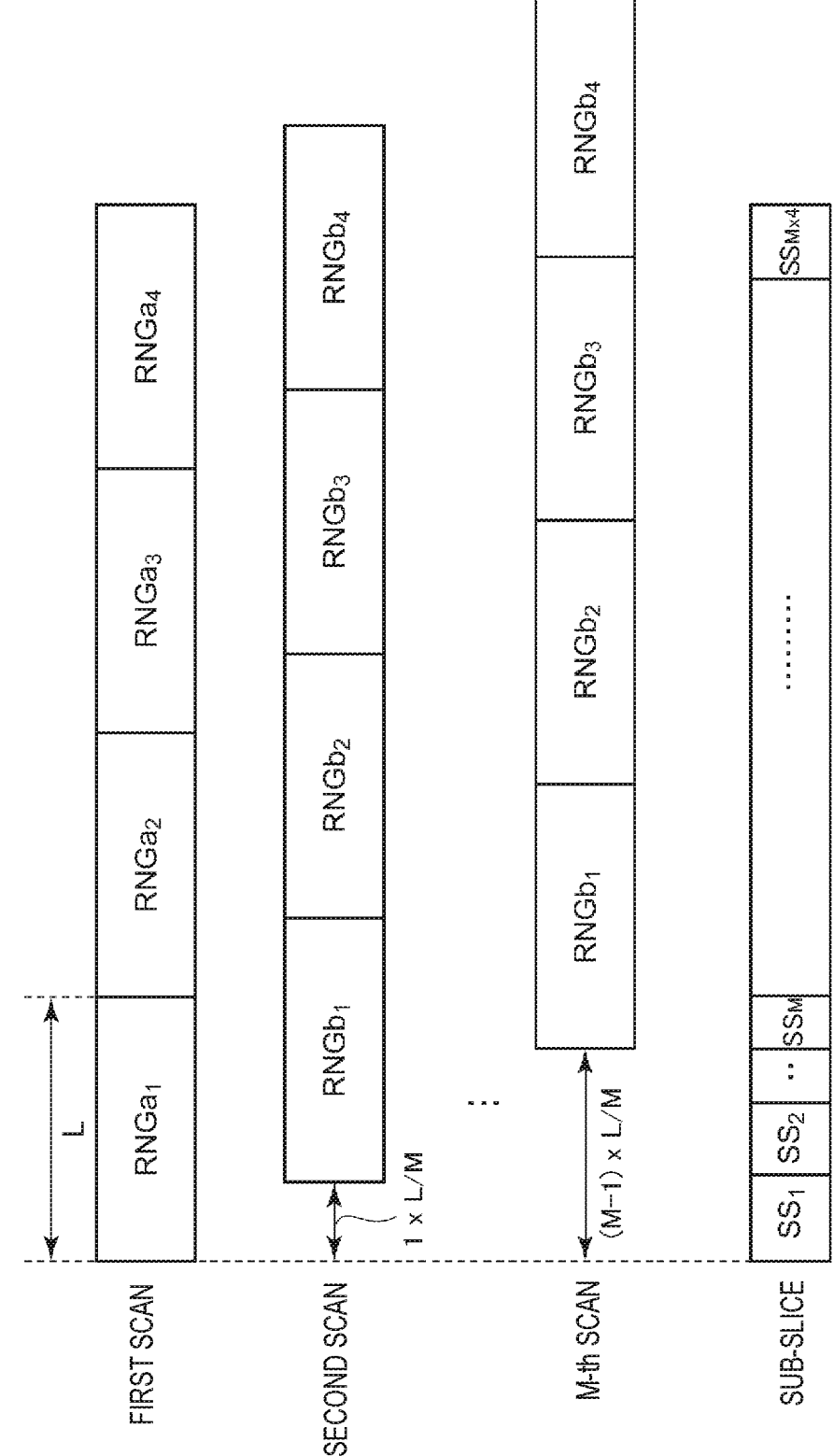
FIG. 27 illustrates operation of a gating camera according to Modification 3.4.

In the embodiment, two scans of a first scan and a second scan are executed, and in each scan, a boundary of a slice is shifted by ½ in the depth direction, but the present invention is not restricted to such an arrangement. Also, three or more scans may be executed. FIG. 27 illustrates operation of a gating camera according to Modification 3.4.

In general, the camera controller 130 is capable of switching a first scan to an M-th scan (M≥2). As shown in FIG. 27, multiple slice boundaries of the first scan to the M-th scan are shifted by 1/M slice in the depth direction. The arithmetic processing device 140 processes a first slice image group generated in the first scan, a second slice image group generated in the second scan, . . . an M-th slice image group generated in the M-th scan, so as to generate an image of a sub-slice SS that is a range obtained by dividing each slice into M portions in the depth direction. The calculation method of the sub-slice image may preferably be determined giving consideration to the length of the light emission time $\tau_2$ in the same manner as in the case of M=2.

(Usage)

Figure 28:
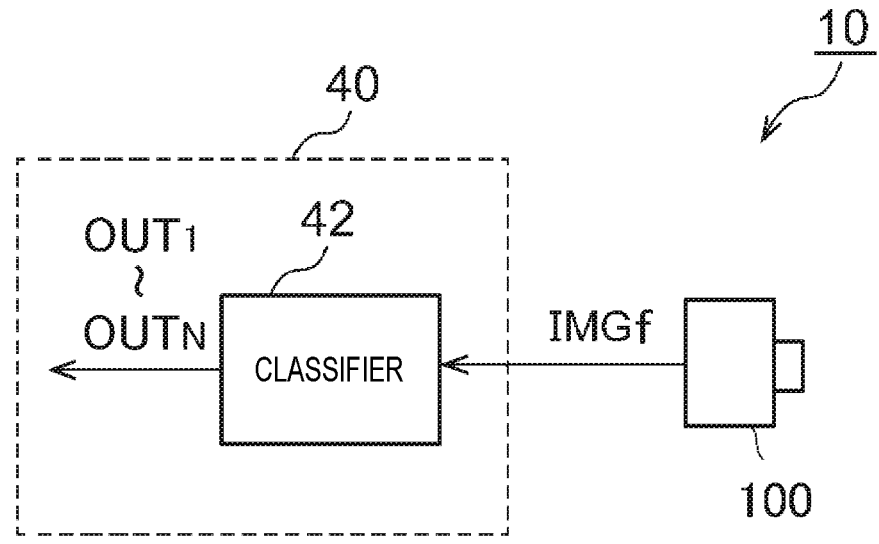
FIG. 28 is a block diagram of a sensing system.

FIG. 28 is a block diagram of the sensing system 10. The sensing system 10 includes an arithmetic processing device 40 in addition to the gating camera 100 described above. The sensing system 10 is an object detection system mounted on a vehicle such as an automobile, a motorcycle, or the like, and configured to determine the kind (category or class) of an objects OBJ existing around the vehicle.

The gating camera 100 generates multiple slice images $IMG_1$ to $IMG_N$ that correspond to the multiple slice $RNG_1$ to $RNG_N$. The gating camera 100 outputs image data IMGf based on the multiple slice images $IMG_1$ to $IMG_N$.

The arithmetic processing device 40 is configured to identify the kind of an object based on the output data IMGf of the gating camera 100. The arithmetic processing device 40 is provided with a classifier 42 implemented based on a learned model generated by machine learning. Also, the arithmetic processing device 40 may include multiple classifiers 42 optimized for the respective slices. The algorithm of the classifier 42 is not limited in particular. Examples of algorithms that can be employed include You Only Look Once (YOLO), Single Shot Multi Box Detector (SSD), Region-based Convolutional Neural Network (R-CNN), Spatial Pyramid Pooling (SPP net), Faster R-CNN, Deconvolution-SSD (DSSD), Mask RCNN, or the like. Also, other algorithms that will be developed in the future may be employed.

The arithmetic processing device 40 may be implemented as a combination of a processor (hardware) such as a central processing unit (CPU), a micro processing unit (MPU), a microcontroller, or the like, and a software program to be executed by the processor (hardware). The arithmetic processing device 40 may be a combination of multiple processors. Alternatively, the arithmetic processing device 40 may be configured as hardware alone. The functions of the arithmetic processing device 40 and the arithmetic processing device 140 may be implemented in the same processor.

Figures 29A, 29B:
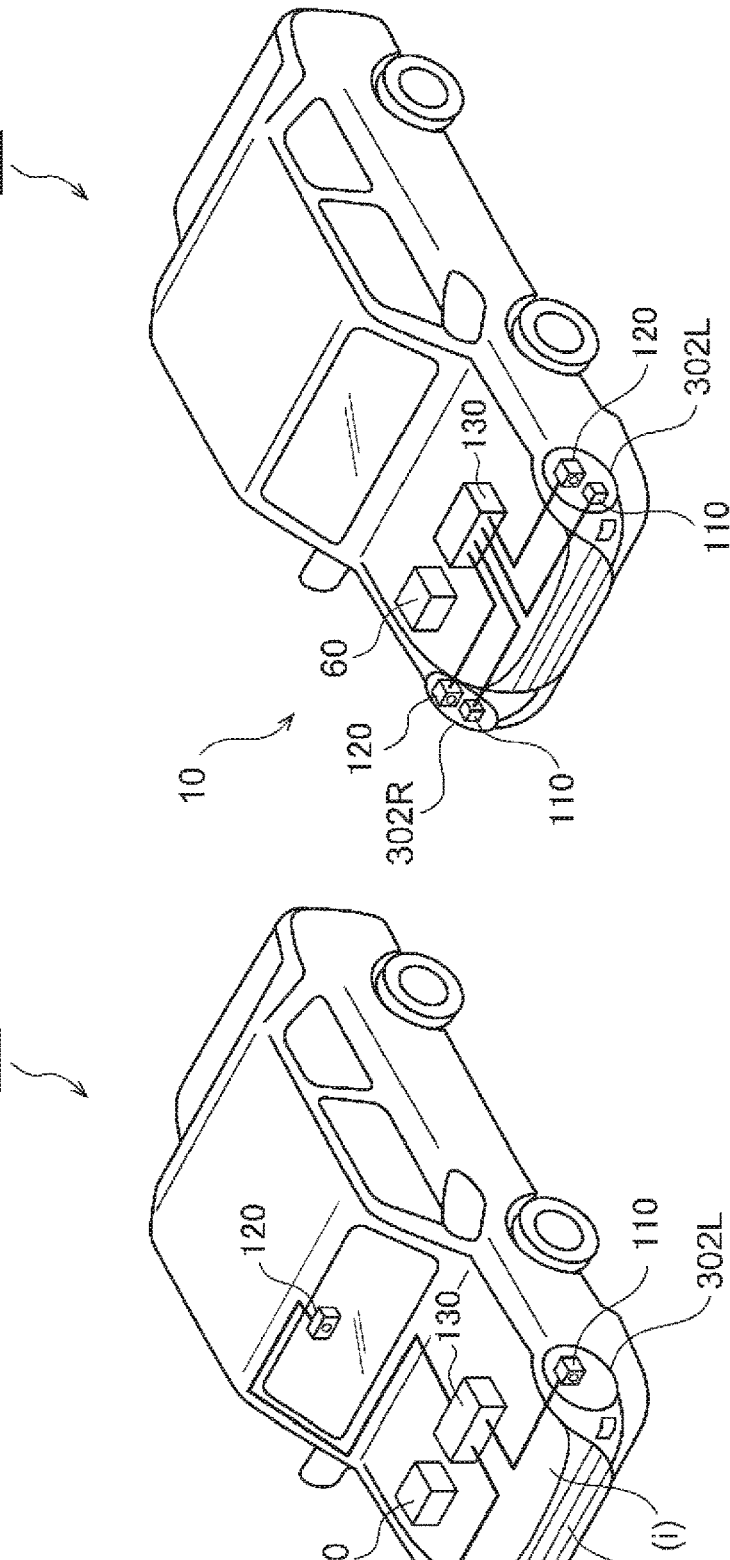
FIG. 29A and FIG. 29B are diagrams illustrating an automobile provided with the gating camera.

FIG. 29A and FIG. 29B are diagrams illustrating an automobile 300 provided with the gating camera 100. Referring to FIG. 29A, the automobile 300 includes headlamps (lamps) 302L and 302R.

As shown in FIG. 29A, the illumination apparatus 110 of the gating camera 100 may be built into at least one of the left and right headlamps 302L and 302R. The image sensor 120 may be mounted on a part of a vehicle, for example, on the back side of a rear-view mirror. Alternatively, the image sensor 120 may be provided in a front grille or a front bumper. The camera controller 130 may be provided in an interior of the vehicle or an engine compartment, and may be built into the headlamps 302L and 302R.

As shown in FIG. 29B, the image sensor 120 may be built into any one of the left and right headlamps 302L and 302R together with the illumination apparatus 110.

The illumination apparatus 110 may be provided as a part of the vehicle, for example, on a back side of a rear-view mirror, a front grille, or a front bumper.

Figure 30:
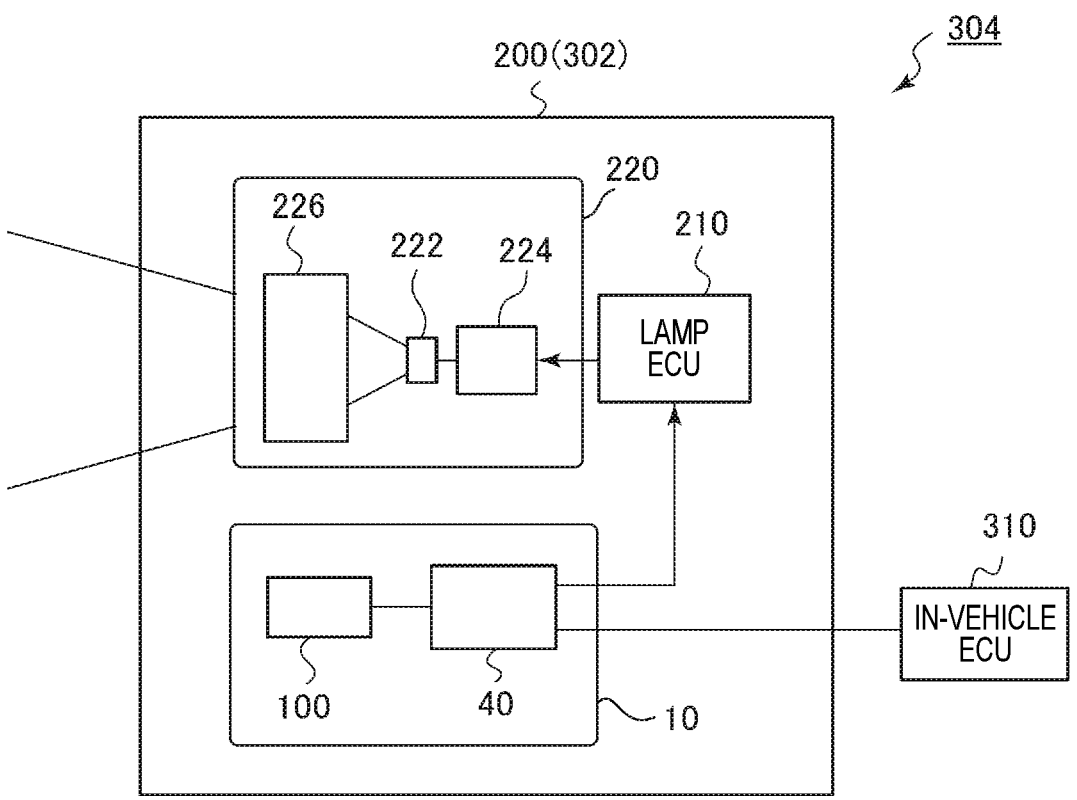
FIG. 30 is a block diagram illustrating a vehicle lamp provided with the sensing system.

FIG. 30 is a block diagram showing a vehicle lamp 200 provided with the sensing system 10. The vehicle lamp 200 forms a lamp system 304 together with an in-vehicle ECU 310. The vehicle lamp 200 includes a lamp ECU 210 and a lamp unit 220. The lamp unit 220 is a low beam unit or a high beam unit, and includes a light source 222, a lighting circuit 224, and an optical system 226. Furthermore, the vehicle lamp 200 is provided with the sensing system 10.

The information on the object OBJ detected by the sensing system 10 may be used for light distribution control of the vehicle lamp 200. Specifically, the lamp ECU 210 generates a suitable light distribution pattern based on the information on the kind of the object OBJ and a position thereof generated by the sensing system 10. The lighting circuit 224 and the optical system 226 operate so as to provide the light distribution pattern generated by the lamp ECU 210. The arithmetic processing device 40 of the sensing system 10 may be provided outside the vehicle lamp 200, that is, on the vehicle side.

The information on the object OBJ detected by the sensing system 10 may be transmitted to the in-vehicle ECU 310. The in-vehicle ECU 310 may use the information for autonomous driving or driving support.

The embodiments have been described for exemplary purposes only, showing one aspect of the principles and applications of the present invention. Also, many modifications and variations can be made to the embodiments without departing from the spirit of the present invention as defined in the claims.

INDUSTRIAL APPLICABILITY

The present invention relates to a gating camera.

REFERENCE SIGNS LIST

L1 illumination light
S1 light emission timing signal
S2 exposure timing signal
10 sensing system
40 arithmetic processing device
42 classifier
100 gating camera
110 illumination apparatus
120 image sensor
122 pixel array
124 vertical scanning circuit
126 readout circuit
130 camera controller
140 arithmetic processing device
200 vehicle lamp
210 lamp ECU
220 lamp unit
222 light source
224 lighting circuit
226 optical system
300 automobile
302L headlamp
304 lamp system
310 in-vehicle ECU.

The invention claimed is:

1. A gating camera for dividing a field of view into multiple slices in a depth direction and generating multiple slice images that correspond to the multiple slices, the gating camera comprising:

an illumination apparatus configured to emit illumination light to the field of view;

an image sensor;

a camera controller configured to control a light emission timing of the illumination apparatus and an exposure timing of the image sensor so as to generate slice images from a near slice to a farther slice; and an arithmetic processing device configured to judge whether a road surface appears for each of the slice images generated in sequence, wherein processing for a row judged to include a road surface in a given slice is simplified at the time of sensing of a slice farther than the given slice, and the arithmetic processing device judges whether a road surface appears in multiple rows of the slice image, and when it is judged that the road surface appears in a given row, a row lower than the given row is treated as the one in which the road surface appears without performing judgment processing.

2. The gating camera according to claim 1, wherein the processing of the row is simplified by skipping reading of a row in the image sensor.

3. The gating camera according to claim 1, wherein the arithmetic processing device judges that the road surface appears when the number of effective pixels having pixel values included in a predetermined range among multiple pixels constituting a single row is larger than a predetermined number.

4. The gating camera according to claim 3, wherein the predetermined range changes dynamically.

5. The gating camera according to claim 1, wherein the arithmetic processing device excludes a row upper than a reference row from a judgment target.

6. The gating camera according to claim 1, wherein the image sensor is a multi-tap image sensor having multiple charge accumulation regions, the gating camera is configured to sense multiple adjacent slices in parallel using the multiple charge accumulation regions in one sensing, and multiple slice images acquired in parallel in the one sensing have the same size.

7. The gating camera according to claim 1, wherein the image sensor is a multi-tap image sensor having multiple charge accumulation regions, the gating camera is configured to generate multiple slice images corresponding to multiple adjacent slices in parallel using the multiple charge accumulation regions in one sensing, and the multiple slice images acquired in parallel in the one sensing have different sizes.

8. The gating camera according to claim 1, wherein the arithmetic processing device is configured to calculate a distance to an object appearing in each pixel based on pixel values of two adjacent slice images, and processing for a row judged to include a road surface in a given slice is simplified at the time of sensing of a slice that is two or more farther from the given slice.

\*    \*    \*    \*    \*